(12) United States Patent
Takaku et al.

(10) Patent No.: US 6,383,267 B1
(45) Date of Patent: May 7, 2002

(54) EXHAUST GAS CLEANING SYSTEM FOR AN ENGINE

(75) Inventors: Yutaka Takaku, Mito; Shigeru Kawamoto, Hitachi; Yoshihisa Fujii; Shinji Nakagawa, both of Hitachinaka; Toshio Ishii, Mito; Minoru Ohsuga, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/592,678

(22) Filed: Jun. 12, 2000

(30) Foreign Application Priority Data

Jun. 10, 1999 (JP) .............................. 11-163441

(51) Int. Cl.$^7$ .............................................. B01D 53/04
(52) U.S. Cl. ............................ 96/111; 96/117; 96/143; 55/385.3; 55/DIG. 10; 55/DIG. 30
(58) Field of Search ........................... 96/109, 111, 117, 96/130, 143; 55/385.1, 385.3, DIG. 10, DIG. 30

(56) References Cited

U.S. PATENT DOCUMENTS

| 4,522,027 A | * | 6/1985 | Hasegawa et al. ..... 55/DIG. 10 |
| 4,544,388 A | * | 10/1985 | Rao et al. .............. 55/DIG. 10 |
| 4,733,605 A | * | 3/1988 | Holter et al. ............. 96/111 X |
| 5,743,084 A | | 4/1998 | Hepburn ...................... 60/274 |
| 5,941,066 A | * | 8/1999 | Araki et al. ........... 55/DIG. 30 |
| 6,010,547 A | * | 1/2000 | Jeong et al. ........... 55/DIG. 10 |
| 6,090,187 A | * | 7/2000 | Kumagai ............... 55/DIG. 10 |
| 6,212,882 B1 | * | 4/2001 | Greger et al. ............. 96/143 X |
| 6,233,927 B1 | * | 5/2001 | Hirota et al. .......... 55/DIG. 30 |
| 6,237,326 B1 | * | 5/2001 | Russell ................... 55/DIG. 30 |

FOREIGN PATENT DOCUMENTS

WO         WO94/17291         2/1995

* cited by examiner

*Primary Examiner*—Robert H. Spitzer
(74) *Attorney, Agent, or Firm*—Crowell & Moring LLP

(57) ABSTRACT

An exhaust gas cleaning system for an engine capable of judging the amount of trapped $NO_x$ and the oxygen storage capacity of an $NO_x$ trap agent and which can diagnose the deterioration of the $NO_x$ trap agent. The $NO_x$ trap is arranged in an exhaust gas passage and the air-fuel ratio of the exhaust gas is temporally changed from a lean air-fuel ratio to the stoichiometric air-fuel ratio or a rich air-fuel ratio with a predetermined cycle. The $NO_x$ trapping occurs by absorbing or adsorbing $NO_x$ in the exhaust gas when an air-fuel ratio of the exhaust gas is a lean air-fuel ratio and by releasing or reducing $NO_x$ when the air-fuel ratio is a rich air-fuel ratio. The amount of trapped $NO_x$ is judged from the oxygen concentration and the oxygen concentration in the exhaust gas is detected in the exhaust gas passage in the downstream side of the $NO_x$ trap and determined by taking the oxygen storage capacity when the air-fuel ratio of the exhaust gas changes to the stoichiometric air-fuel ratio or the rich air-fuel ratio.

14 Claims, 10 Drawing Sheets

AMOUNT OF TRAPPED NOx

AMOUNT OF STORED OXYGEN

EXHAUST GAS CLEANING SYSTEM FOR AN ENGINE

BACKGROUND OF THE INVENTION

The present invention relates to an exhaust gas cleaning system for an engine.

There are technologies of improving fuel economy of an engine in which an air-fuel ratio is set to a value having an air concentration higher (hereinafter, referred to as "a lean air-fuel ratio") than that in the theoretical air-fuel ratio (hereinafter, referred to as "the stoichiometric air-fuel ratio"), and fuel is burned under the lean air-fuel ratio.

For example, a method of injecting fuel from a position near an air-intake port in an intake pipe portion (a port injection method) which can perform lean burning under a condition of an air-fuel ratio from 20 to 25 and a method of injecting fuel directly into a cylinder (in-cylinder injection method) which can perform very lean burning under a condition of an air-fuel ratio from 40 to 50 comes into practical use. These technologies can reduce the pumping loss and the heat loss by performing lean burning, that is, by increasing an amount of intake air, and accordingly can improve fuel economy.

From the viewpoint of exhaust gas cleaning, in a case of burning under the stoichiometric air-fuel ratio condition, HC, CO and $NO_x$ in an exhaust gas can be cleaned by being oxidized and reduced at a time by a ternary catalyst. However, in the case of burning under the lean condition, it is difficult to reduce $NO_x$ because the exhaust gas is in a condition of excessive oxygen. Therefore, an exhaust gas cleaning system for an engine is proposed. In the exhaust gas cleaning system for an engine, an $NO_x$ absorbent is placed in an exhaust gas passage to absorb $NO_x$ in the exhaust gas when the air-fuel ratio of exhaust gas is lean and to release the absorbed $NO_x$ from the $NO_x$ absorbent and to reduce or contact-reduce the $NO_x$ when the air-fuel ratio is rich (a condition of excessive fuel). The air-fuel ratio temporally changed from the lean air-fuel ratio to the stoichiometric or rich air-fuel ratio with a predetermined cycle to release or reduce the $NO_x$ trapped by the $NO_x$ absorbent in order to recover the $NO_x$ trapping performance (hereinafter, generically referred to as "purge").

In such an exhaust gas cleaning system, in order to improve the fuel economy and reduce the compositions in the exhaust gas such as HC and so on, it is preferable that the period of the temporary change of the air-fuel ratio to the stoichiometric or rich air-fuel ratio condition is limited to only a period corresponding to an amount of absorbed $NO_x$.

A technology of judging completion of $NO_x$ purge at temporary changing of the air-fuel ratio to the stoichiometric or rich air-fuel ratio is proposed in U.S. Pat. No. 2,692,380 (WO94/17291). After changing of the air-fuel ratio from the lean air-fuel ratio to the stoichiometric or rich air-fuel ratio, it is judged completion of $NO_x$ purge at the time when the air-fuel ratio detected by an air-fuel ratio sensor placed in the downstream side of the $NO_x$ absorbent changes from the lean air-fuel ratio to the rich air-fuel ratio. This is based on that until the $NO_x$ absorbed by the $NO_x$ absorbent is purged even if the air-fuel ratio in the upstream side of the $NO_x$ absorbent changes to the stoichiometric or rich air-fuel ratio, the air-fuel ratio detected by the air-fuel ratio sensor placed in the downstream side of the $NO_x$ absorbent is in a slightly lean air-fuel ratio because HC and CO in the exhaust gas flowing from the upstream side are consumed to reduce $NO_x$, and the air-fuel ratio detected by the air-fuel ratio sensor becomes in the rich air-fuel ratio condition after completion of purging of the $NO_x$ absorbed by the $NO_x$ absorbent.

Japanese Patent Application Laid-Open. No. 10-128058 (U.S. Pat. No. 5,743,084) discloses the similar technology in which performance of an $NO_x$ trapping unit is monitored by estimating an amount of absorbed $NO_x$ from a time difference between the time when the air-fuel ratio is changed from the lean air-fuel ratio to the stoichiometric or rich air-fuel ratio to the time when the air-fuel ratio detected by an air-fuel ratio sensor placed in the downstream side of the $NO_x$ absorbent changes from the lean air-fuel ratio to the rich air-fuel ratio.

However, a waveform of the air-fuel ratio sensor placed in the downstream side of the $NO_x$ absorbent or trap (hereinafter, generically referred to as "$NO_x$ trap") is affected by an oxygen storage capacity (OSC) even if an amount of $NO_x$ trapped by the $NO_x$ trap is the same. The above-mentioned technologies do not take this fact into consideration.

SUMMARY OF THE INVENTION

An object of the present invention is to provide an exhaust gas cleaning system for an engine which is capable of separately judging an amount of trapped $NO_x$ and an oxygen storage capacity of an $NO_x$ trap agent and capable of diagnosing deteroration of the $NO_x$ trap agent.

The above object can be attained by an exhaust gas cleaning system for an engine comprising an $NO_x$ trap for trapping by absorbing or adsorbing $NO_x$ in an exhaust gas when an air-fuel ratio of the exhaust gas is a lean air-fuel ratio and for releasing or reducing $NO_x$, when the air-fuel ratio is a rich air-fuel ratio, the $NO_x$ trap being arranged in an exhaust gas passage; and an air-fuel ratio changing means for temporally changing the air-fuel ratio of the exhaust gas from a lean air-fuel ratio to the stoichiometric air-fuel ratio or a rich air-fuel ratio with a predetermined cycle, which comprises an oxygen concentration detecting means for detecting an oxygen concentration in the exhaust gas in the downstream side of the $NO_x$ trap in the exhaust gas passage; and an $NO_x$ trap amount judging means for judging an amount of trapped $NO_x$ of the $NO_x$ trap from a detected result of said oxygen concentration detecting means in taking an oxygen storage capacity when the air-fuel ratio changing means temporally changes the air-fuel ratio of the exhaust gas to the stoichiometric air-fuel ratio or the rich air-fuel ratio.

DESCRIPTION OF THE PREFERRED EMBODIMENTS

Figure 1:
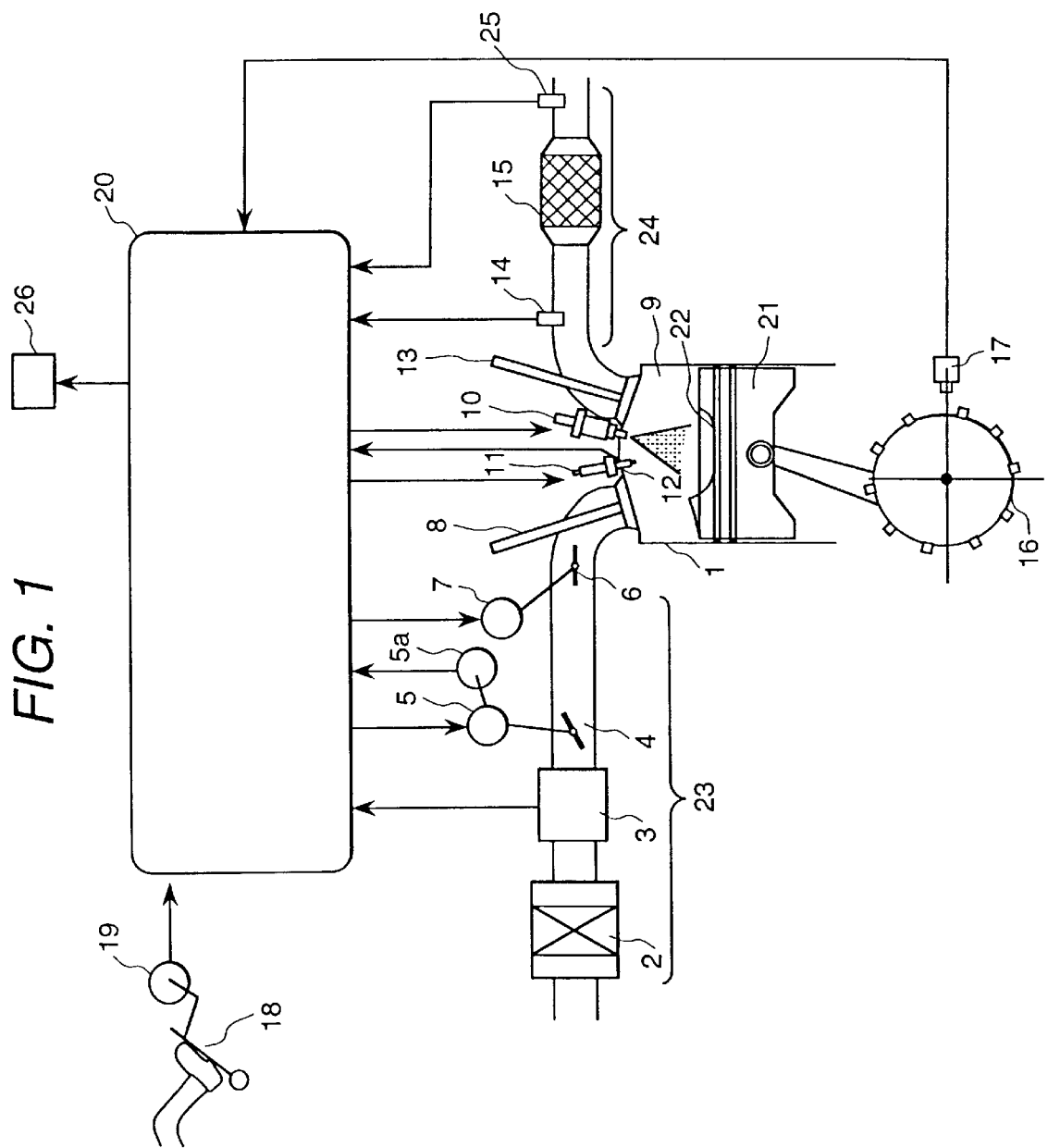
FIG. 1 is a diagram showing an embodiment of an exhaust gas cleaning system for an engine in accordance with the present invention.

In a case, for example, where an $NO_x$ trap itself has an oxygen storage capacity or in a case where a catalyst having an oxygen storage capacity is arranged at an upstream or downstream position near an $NO_x$ trap, oxygen is stored during lean operation and the stored oxygen is released when the air-fuel ratio is changed from the lean air-fuel ratio to the stochiometric air-fuel ratio or the rich air-fuel ratio. As a result, an output of an air-fuel ratio sensor placed at a position downstream of the catalyst having oxygen storage capacity is effected by the oxygen released from the catalyst.

Therefore, in a case where an amount of trapped $NO_x$ absorbed by the $NO_x$ trap or the trapping performance of the $NO_x$ trap is estimated using the air-fuel ratio sensor, the oxygen released from the catalyst may become a cause of large error. For example, if the oxygen storage capacity is large, the time period that the output of the air-fuel ratio sensor placed at the position downstream of the $NO_x$ trap indicates the state of lean air-fuel ratio is lengthened when the air-fuel ratio is temporally changed from the lean air-fuel ratio to the stoichiometric air-fuel ratio or the rich air-fuel ratio. Consequently, the amount of trapped $NO_x$ is erroneously judged overestimated. On the other hand, if the oxygen storage capacity is small, the output of the air-fuel ratio sensor placed at the position downstream of the $NO_x$ trap indicates the state of rich air-fuel ratio earlier than the actual state when the air-fuel ratio is temporally changed from the lean air-fuel ratio to the stoichiometric air-fuel ratio or the rich air-fuel ratio. Consequently, the amount of trapped $NO_x$ is erroneously judged underestimated.

Although an amount of stored oxygen can reach its oxygen storage capacity in a short time by performing lean operation, an erroneous judgment on the amount of trapped $NO_x$ as described above may occur because the oxygen storage capacity itself is varied by its deterioration or the like.

In addition, in the $NO_x$ trap having the oxygen storage capacity or in the catalyst having the oxygen storage capacity arranged at the upstream or downstream position near the $NO_x$ trap, oxidation reaction of unburned HC and CO and reduction reaction of $NO_x$ based on the oxygen storage capacity occur. Therefore, these oxidation and reduction reactions are weakened when the oxygen storage capacity is reduced, which indicates deterioration of the $NO_x$ trap or the catalyst having the oxygen storage capacity arranged at the upstream or downstream position near the $NO_x$ trap. Accordingly, it is required to separately detect the oxygen storage capacity. In this case, the oxygen storage capacity is necessary to be also detected separately from the amount of trapped $NO_x$, similarly to the above.

It was found from an experiment that when the $NO_x$ trap was deteriorated, there was a relatively strong correlation between the oxygen storage capacity and the exhaust gas cleaning performance (ternary catalytic performance) under the stoichiometric state, but there was no correlation between the oxygen storage capacity and the $NO_x$ trapping capacity.

In regard to technologies of detecting an oxygen storage capacity of an $NO_x$ absorbent, Japanese Patent Application Laid-Open No. 8-260949 discloses a technology of detecting an oxygen storage capacity based on an output from an air-fuel ratio sensor arranged downstream of an $NO_x$ absorbent when an amount of absorbed $NO_x$ is nearly zero. However, this technology requires a process of decreasing the amount of stored $NO_x$ to nearly zero in order to detect the oxygen storage capacity. In order to detect the amount of absorbed $NO_x$, it is necessary to detect an oxygen storage capacity when the amount of absorbed $NO_x$ is nearly zero and to subtract the oxygen storage capacity from a detected result when the amount of absorbed $NO_x$ is not zero. Accordingly, the process is complex and the error is increased. In addition to this, an operating condition at detecting the oxygen storage capacity is not always equal to an operating condition at detecting the amount of absorbed $NO_x$, and accordingly change in the oxygen storage capacity due to difference in temperature of the $NO_x$ absorbent becomes a detection error of the amount of absorbed $NO_x$.

An object of the present invention is to provide an exhaust gas cleaning system for an engine which can separately detect an amount of trapped $NO_x$ by $NO_x$ adsorption or absorption and an oxygen storage capacity without occurring the errors described above.

In order to solve the above-mentioned problems, an exhaust gas cleaning system for an engine in accordance with the present invention is characterized by comprising an $NO_x$ trap for trapping by absorbing or adsorbing $NO_x$ in an exhaust gas when an air-fuel ratio of the exhaust gas is a lean air-fuel ratio and for releasing or reducing $NO_x$ when the air-fuel ratio is a rich air-fuel ratio, the $NO_x$ trap being arranged in an exhaust gas passage; and an air-fuel ratio changing means for temporally changing the air-fuel ratio of the exhaust gas from a lean air-fuel ratio to the stoichiometric air-fuel ratio or a rich air-fuel ratio with a predetermined cycle, which comprises an oxygen concentration detecting means for detecting an oxygen concentration in the exhaust gas in the downstream side of the $NO_x$ trap in the exhaust gas passage; and an $NO_x$ trap amount judging means for judging an amount of trapped $NO_x$ of the $NO_x$ trap from a detected result of said oxygen concentration detecting means in taking an oxygen storage capacity when the air-fuel ratio changing means temporally changes the air-fuel ratio of the exhaust gas to the stoichiometric air-fuel ratio or the rich air-fuel ratio.

Preferably, the exhaust gas cleaning system for an engine in accordance with the present invention is characterized by that the $NO_x$ trap amount judging means judges an amount of trapped $NO_x$ of the $NO_x$ trap based on a waveform between a first threshold expressing the lean air-fuel ratio condition and a second threshold expressing the rich air-fuel ratio condition, the waveform being a detected result of the oxygen concentration detecting means when the air-fuel ratio changing means temporally changes the air-fuel ratio of the exhaust gas to the stoichiometric air-fuel ratio or the rich air-fuel ratio.

Preferably, the exhaust gas cleaning system for an engine in accordance with the present invention is characterized by that the $NO_x$ trap amount judging means judges an amount of trapped $NO_x$ of the $NO_x$ trap based on a required time period from a time point when a signal crosses the first threshold to a time point when the signal crosses the second threshold, the signal being a detected result of the oxygen concentration detecting means when the air-fuel ratio changing means temporally changes the air-fuel ratio of the exhaust gas to the stoichiometric air-fuel ratio or the rich air-fuel ratio.

Preferably, the exhaust gas cleaning system for an engine in accordance with the present invention is characterized by that a degree of deterioration of the. $NO_x$ trap is detected based on a judged result of the $NO_x$ trap amount judging means.

Preferably, the exhaust gas cleaning system for an engine in accordance with the present invention is characterized by that, a degree of deterioration of the $NO_x$ trap is detected based on a judged value of an amount of trapped $NO_x$ from the $NO_x$ trap amount judging means at a predetermined operating condition of the engine.

Preferably, the exhaust gas cleaning system for an engine in accordance with the present invention is characterized by that a degree of deterioration of the $NO_x$ trap is detected based on a judged value of an amount of trapped $NO_x$ from the $NO_x$ trap amount judging means and an operating condition of the engine at the time when the judgment is made.

Preferably, the exhaust gas cleaning system for an engine in accordance with the present invention is characterized by that lean operation of the engine is limited corresponding to the detected degree of deterioration of the $NO_x$ trap.

Preferably, the exhaust gas cleaning system for an engine in accordance with the present invention is characterized by comprising at least one of a memory means for storing a code expressing deterioration of the $NO_x$ trap and a warning generating means for generating warning when the degree of deterioration of the $NO_x$ trap exceeds a predetermined value.

Another exhaust gas cleaning system for an engine in accordance with the present invention is characterized by comprising an $NO_x$ trap for trapping by absorbing or adsorbing $NO_x$ in an exhaust gas when an air-fuel ratio of the exhaust gas is a lean air-fuel ratio and for releasing or reducing $NO_x$ when the air-fuel ratio is a rich air-fuel ratio, the $NO_x$ trap being arranged in an exhaust gas passage; and an air-fuel ratio changing means for temporally changing the air-fuel ratio of the exhaust gas from the lean air-fuel ratio to the stoichiometric air-fuel ratio or the rich air-fuel ratio with a predetermined cycle, which comprises an oxygen concentration detecting means for detecting an oxygen concentration in the exhaust gas in the downstream side of the $NO_x$ trap in the exhaust gas passage; and an oxygen storage capacity judging means for judging an oxygen storage capacity based on a time period from a time point when the air-fuel ratio changing means temporally changes the air-fuel ratio of the exhaust gas to the stoichiometric air-fuel ratio or the rich air-fuel ratio to a time point when a detected result of the oxygen concentration detecting means crosses a first threshold expressing the lean air-fuel ratio condition.

Embodiments of the present invention will be described below, referring to the accompanied drawings.

FIG. 1 is a diagram showing an embodiment of an air-fuel ratio control system for an engine in accordance with the present invention. This embodiment is in a case of an example of an in-cylinder injection type. In an air intake system 23 of an engine 1, there are arranged an air cleaner 2, an air flow sensor 3 for detecting an amount of intake air, a throttle valve 4 for regulating the amount of intake air, a throttle valve drive means 5, a throttle opening degree sensor 5a, a swirl control valve 6, a swirl control valve drive means 7 and an air intake valve 8. Each of the swirl control valves 6 is arranged just before the air intake valve 8 for each cylinder, and the swirl control valves are constructed so as to be operated together. In a combustion chamber 9 in the engine 1, there are arranged a fuel injection valve 10 for directly injecting fuel into the combustion chamber 9, a spark plug 11 and an in-cylinder pressure sensor 12. In an exhaust gas system 24 of the engine 1, there are arranged an exhaust gas valve 13, a first air-fuel ratio sensor 14, an $NO_x$, trap 15 and a second air-fuel ratio sensor 25. Further, the engine 1 comprises a sensing plate 16 attached to a crank shaft of the engine 1, a crank angle sensor 17 for detecting a rotational speed and a crank angle by detecting a projecting portion of the sensing plate, and an accelerator sensor 19 for detecting a degree of stepping on an accelerator pedal 18.

Each of detected values of the sensors is input to an electronic control circuit (hereinafter, referred to as "ECU") 20, and the ECU 20 detects or calculates a degree of accelerator stepping-on, an amount of air-intake, a rotational speed, a crank angle, an in-cylinder pressure and a degree of throttle opening. The ECU 20 calculates an amount and a timing of fuel supplied to the engine based on the results to output a drive pulse to the fuel injection valve 10, and calculates an opening degree of the throttle valve 4 to output a control signal to the throttle valve drive means 5, and calculates an ignition timing and so on to output an ignition signal to the spark plug 11. Further, when the $NO_x$ trap 15 is judged to be deteriorated, the ECU 20 outputs a signal to a warning lamp 26 for giving the warning to a driver.

Fuel is pumped from a fuel tank, not shown, by a fuel pump and kept at a preset pressure (5 to 15 MPa) by a fuel pressure regulator to be supplied to the fuel injection valve 10. An appropriate amount of fuel is directly injected into the combustion chamber 9 at an appropriate timing by the drive pulse output from the ECU 20. Operating modes of the engine 1 are stoichiometric operation, homogeneous lean operation, stratified lean operation and so on. In the homogeneous lean operation, fuel is injected in the intake stroke to be mixed with air, and the homogeneous mixed gas is burned. In the stratified lean operation, fuel is injected in the compression stroke to distribute the fuel in a layer-shape in the mixed gas so as to focus the fuel (form a dense mixed gas) near the spark plug 11.

The intake air regulated by the throttle valve 4 flows into the combustion chamber through the air intake valve 8. At that time, a swirl intensity is controlled by the swirl control valve 6. In general, the swirl intensity is set high at the stratified lean operation or the homogeneous lean operation, and the swirl intensity is set low at the other operations. Particularly, at the stratified operation, the fuel is focused near the spark plug 11 by preventing the fuel from expanding over the whole combustion chamber 9 by the fuel injection timing, air flow by the swirl and a cavity 22 provided on the upper surface of a piston 21.

The mixed gas of fuel and intake air is burned by being ignited by the spark plug 9. The exhaust gas after being burned is discharged to the exhaust gas system 24 through the exhaust valve 13. The exhaust gas flows into the $NO_x$ trap 15 placed in the exhaust gas system 24.

The first air-fuel ratio sensor 14 outputs a signal corresponding to an oxygen concentration in the exhaust gas at a position upstream of the $NO_x$ trap 15, and an actual air-fuel ratio is detected from the output signal. Based on the actual air-fuel ratio detected by the first air-fuel ratio sensor 14, an air-fuel ratio of the supplied mixed gas is feedback controlled so as to become a target air-fuel ratio.

The second air-fuel ratio sensor 25 outputs a signal corresponding to an oxygen concentration in the exhaust gas at a position downstream of the $NO_x$ trap 15, and an actual air-fuel ratio is detected from the output signal. Based on the actual air-fuel ratio detected by the second air-fuel ratio sensor 25, an amount of trapped $NO_x$ adsorbed or absorbed to the $NO_x$ trap 15 is judged.

Figure 2:
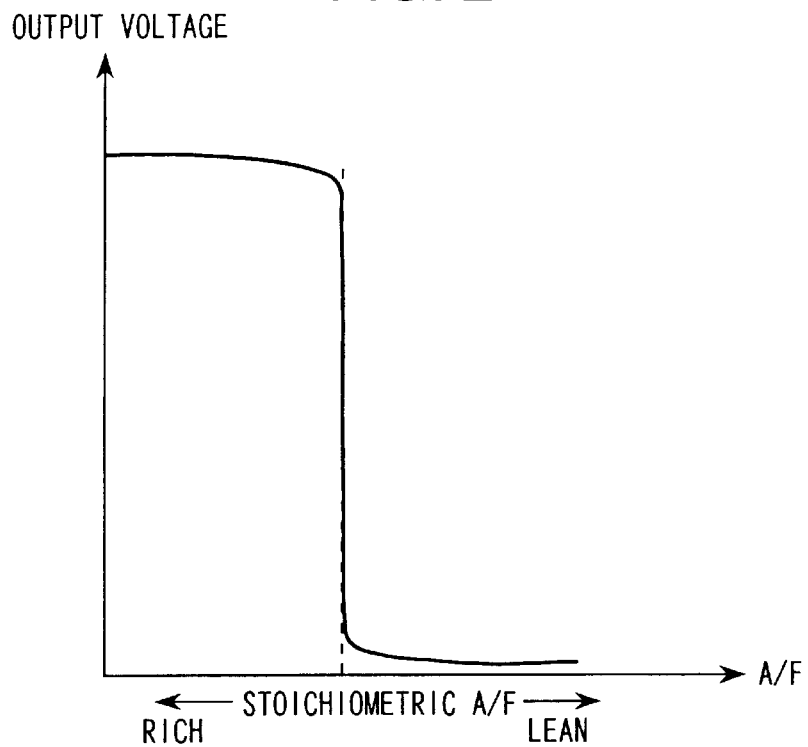
FIG. 2 is a diagram showing the characteristic of an air-fuel ratio sensor.

Although the second air-fuel ratio sensor 25 employed in the present embodiment is a so-called $O_2$ sensor in which the output signal is sharply changed at a position near the stoichiometric air-fuel ratio to output a nearly binary signal, as shown in FIG. 2, the present invention does not limit to the $O_2$ sensor. For example, it is possible to employ a so-called wide range air-fuel ratio sensor which generates an output nearly linear to the air-fuel ratio based on the oxygen concentration in the exhaust gas. system 23. Particularly during the stratified operation, a large flow rate of EGR is introduced in order to suppress generation of $NO_x$ and to suppress speed of combustion.

Figure 3:
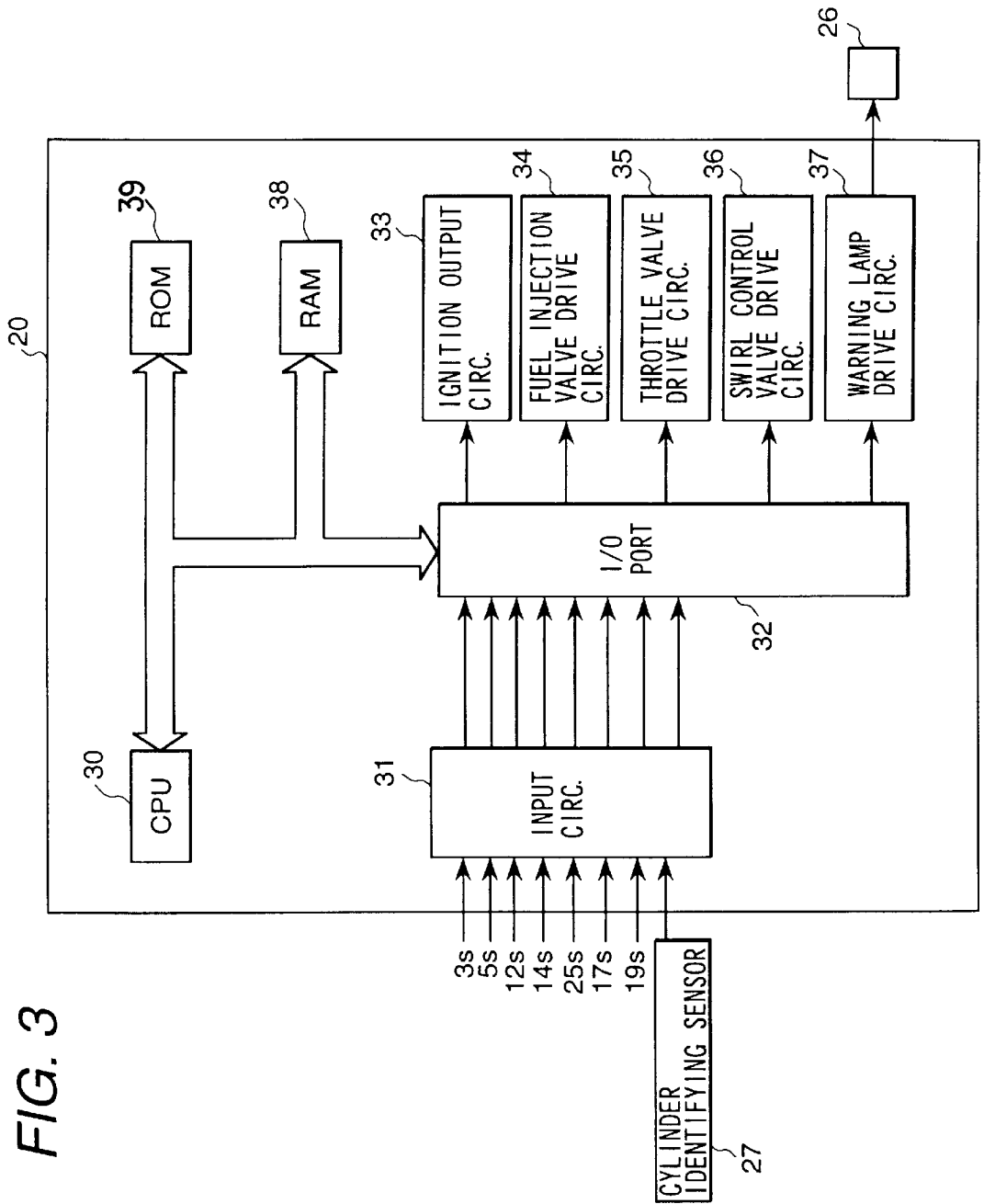
FIG. 3 is a block diagram showing the structure of an engine control unit.

FIG. 3 shows the structure of the ECU 20. Signals 3s, 5s, 12s, 14s, 25s, 17s, 19s from the air flow sensor 3, the throttle valve opening degree sensor 5a, the in-cylinder pressure sensor 12, the first air-fuel ratio sensor 25, the crank angle sensor 17, the accelerator sensor 19 and a signal from a cylinder identifying sensor 27 are input to an input circuit 31. A CPU 30 reads these input signals through an input/output port 32 and executes operation processing based on programs and constants stored in a ROM 39.

Further, an ignition timing, a width and a timing of an injector drive pulse, a throttle valve opening degree command and a swirl control valve opening degree command as the results of the operation processing are output from the CPU 30 to an ignition output circuit 33, a fuel injection valve drive circuit 34, a throttle valve drive circuit 35 and a swirl control valve drive circuit 36 through the input/output port 32 to execute ignition, fuel injection, throttle valve opening degree control and swirl control valve opening degree control. In addition, for example, when it is judged that the $NO_x$ trap 15 is deteriorated, a warning lamp 26 is switched on by a warning lamp drive circuit 37. A RAM 38 is used for storing values of input signals and the results of operation processing.

A fuel injection time Ti is calculated based on a program and constants stored in the ROM 39, for example, based on the following equation, and fuel is injected through the fuel injection value 10 to be supplied to the engine 1.

$$Ti = K \cdot (Qa/Ne) \cdot TGFBA \cdot ALPHA \cdot Kr$$

Therein, K is a coefficient based on characteristics of the fuel injection valve 10 and so on, Qa is an amount of intake air, Ne is a rotational speed of the engine, TGFBA is a target equivalent ratio of the mixed gas to be supplied to the engine 1, and ALPHA is a feedback modification coefficient. Kr is an air-fuel ratio modification coefficient used in air-fuel ratio changing control (hereinafter, referred to as "$NO_x$ purge control") in which the air-fuel ratio of the exhaust gas is temporally changed from the lean air-fuel ratio to the stoichiometric air-fuel ratio or the rich air-fuel ratio with a predetermined cycle.

Figure 4:
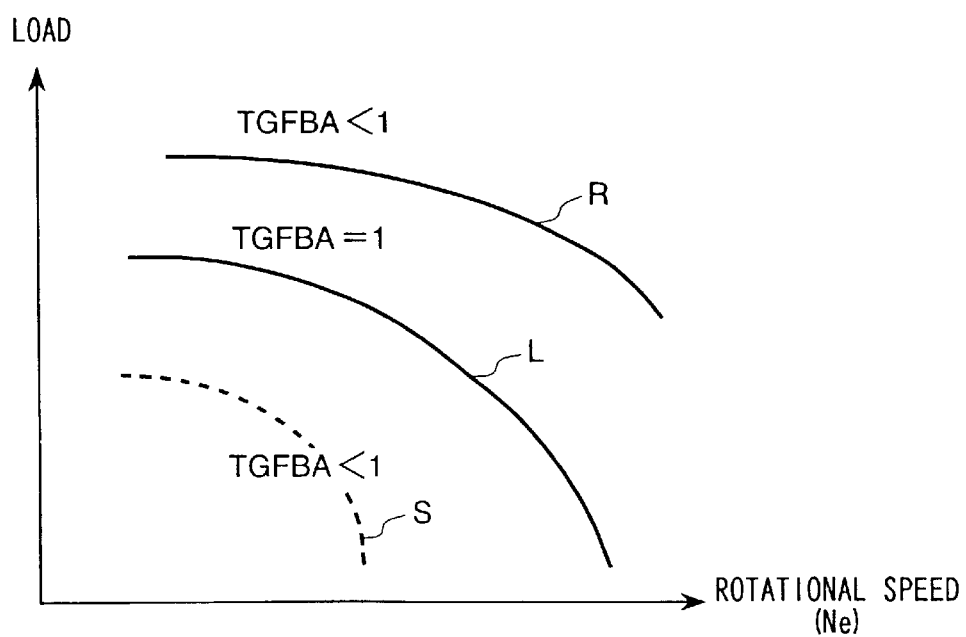
FIG. 4 is a graph showing the map of target equivalent ratio for each operating zone.

When the target equivalent ratio TGFBA is equal to 1, the mixed gas to be supplied to the engine 1 is the stoichiometric air-fuel ratio. On the other hand, when the target equivalent ratio TGFBA is smaller than 1, the mixed gas to be supplied to the engine 1 is the lean air-fuel ratio. When the target equivalent ratio TGFBA is larger than 1, the mixed gas to be supplied to the engine 1 is the rich air-fuel ratio. The target equivalent ratio TGFBA is pre-stored in the ROM 39 as a map of engine rotational speed Ne versus load (for example a target torque calculated based on a signal of the accelerator sensor 19 detecting an amount of stepping-in of the accelerator pedal 18), as shown in FIG. 4. In other words, when an operating condition is within a low load operating zone lower than the solid line L, TGFBA<1, that is, the mixed gas to be supplied to the engine 1 is the lean air-fuel ratio. When an operating condition is within an operating zone between the solid line L and the solid line R, TGFBA=1, that is, the mixed gas to be supplied to the engine 1 is the stoichiometric air-fuel ratio. When an operating condition is within a high load operating zone higher than the solid line R, TGFBA>1, that is, the mixed gas to be supplied to the engine 1 is the rich air-fuel ratio. Further, when an operating condition is within a lower load operating zone lower than the dotted line S in the low load operating zone lower than the solid line L, combustion of a very lean mixed gas having an air-fuel ratio of 40 to 50 is performed by forming a stratified mixed gas (the stratified lean operation). In the operating zone between the solid line R and the dotted line S, combustion of a homogeneous lean mixed gas having an air-fuel ratio of 20 to 25 (the homogeneous lean operation).

During the stoichiometric operation (TGFBA=1, Kr=1), based on the actual air-fuel ratio detected by the first air-fuel ratio sensor 14, the feedback control is performed so that the air-fuel ratio accurately becomes the stoichiometric air-fuel ratio, and the feedback modification coefficient ALPHA is calculated to reflect the fuel injection time Ti. The feedback modification coefficient ALPHA is normally fluctuated around 1.0 by being decreased when the actual air-fuel ratio becomes rich and increased when the actual air-fuel ratio becomes lean. The feedback modification coefficient ALPHA is fixed to an appropriate value or a learned value at operations other than the stoichiometric operation.

During the lean operation (TGFBA<1, Kr=1), $NO_x$ in the exhaust gas is trapped to the $NO_x$ trap 15. When the amount of trapped $NO_x$ becomes a predetermined amount (with a predetermined cycle), the operating condition is switched to TGABA=1, Kr≧1, that is, switched to a low oxygen concentration condition of the stoichiometric air-fuel ratio or the rich air-fuel ratio (the $NO_x$ purge control), and the $NO_x$ trapped to the $NO_x$ trap 15 is released and reduced by HC and CO in the exhaust gas or is contact reduced under the condition trapped to the $NO_x$ trap 15 to recover the $NO_x$ trapping performance. In the case of the in-cylinder injection type engine in the present embodiment, when the air-fuel ratio is switched to the stoichiometric air-fuel ratio or the rich air-fuel ratio, the air-fuel ratio is changed by operating the throttle valve 6 toward the closing direction using the throttle valve drive means 5 to reduce an amount of intake air and at the same time by controlling an amount of supplied fuel, but the switching method is not limited to the above-mentioned method.

The $NO_x$ trap 15 is constructed so as to have the so-called ternary catalytic performance in order to trap $NO_x$, during the lean operation and to maintain the exhaust gas cleaning performance during the stoichiometric operation. The $NO_x$ trap 15 is constructed that alumina is used for the carrier which holds an alkali metal or an alkaline earth metal such as sodium Na, barium Ba or the like and a noble metal such as platinum Pt, rhodium Rh or the like. Further, in order to improve the so-called ternary catalytic performance, some $NO_x$, traps hold cerium Ce having an oxygen storage capacity. The $NO_x$ trap 15 traps $NO_x$ by adsorbing or absorbing $NO_x$ when the air-fuel ratio of the exhaust gas flowing into the $NO_x$ trap is lean, and releases the trapped $NO_x$ when the oxygen concentration in the exhaust gas is reduced for example, when the air-fuel ratio becomes stoichiometric or rich). The released $NO_x$ is reduced by reaction with HC and CO in the exhaust gas with the catalytic effect of, for example, platinum. Otherwise, the $NO_x$ is contact reduced in the condition of being trapped to the $NO_x$ trap 15 to recover the $NO_x$ trapping performance (purge of $NO_x$), in the manner as described above, the amount of $NO_x$ emitted to atmosphere can be reduced. Further, during the stoichiometric operation, since the HC and CO in the exhaust gas are oxidized and the $NO_x$ is reduced by the catalytic effect of, for example, platinum, these exhaust gas components can be reduced. There are some kinds of $NO_x$ traps which have an effect capable of reducing part of $NO_x$ by HC and CO in the exhaust gas even if the air-fuel ratio of the entering exhaust gas is lean.

As described above, $NO_x$ is trapped to the $NO_x$ trap 15 by adsorbing or absorbing when the air-fuel ratio of the exhaust gas is lean. However, there is a limitation in the $NO_x$ trapping capacity of the $NO_x$ trap 15, and the $NO_x$ trap 15 comes to be incapable of trapping $NO_x$ anymore when the $NO_x$ trap traps $NO_x$ until the trapping capacity is saturated. Accordingly, $NO_x$ passes through the $NO_x$ trap 15 to be emitted to atmosphere. Therefore, it is necessary to purge $NO_x$ from the $NO_x$ trap 15 before the trapping capacity of the $NO_x$ trap 15 is saturated. Consequently, it is necessary to estimate what amount of $NO_x$ is trapped to the $NO_x$ trap 15. A method of estimating what amount of $NO_x$ is trapped to the $NO_x$ trap 15 will he described below.

An amount of $NO_x$ (per unit time) trapped to the $NO_x$ trap 15 is increased as an amount of $NO_x$ (per unit time) in the exhaust gas exhausted from the engine 1 is increased. Since the amount of $NO_x$ (per unit time) in the exhaust gas exhausted from the engine 1 is almost determined from a rotational speed and a load of the engine 1, the amount of $NO_x$ (per unit time) trapped to the $NO_x$ trap 15 is a function of the rotational speed and the load of the engine 1. Therefore, the amount of $NO_x$ (per unit time) NOAS trapped to the $NO_x$ trap 15 is measured as the function of the rotational speed and the load of the engine 1 in advance, and the results are pre-stored in the ROM 39 in a form of a map.

While the lean operation is continued, the estimated amount of $NO_x$ TNOA trapped in the $NO_x$ trap 15 can be obtained by accumulating NOAS every predetermined interval as shown by the following equation.

$$TNOA(\text{new})=TNOA(\text{old})+NOAS$$

In the present embodiment, before the time when the estimated amount of $NO_x$ TNOA trapped in the $NO_x$ trap 15 reaches a saturated trapping amount TNOAMX, the air-fuel ratio of the exhaust gas is temporally switched to the stoichiometric or rich air-fuel ratio to purge $NO_x$ from the $NO_x$ trap 15.

It is preferable that the amount of $NO_x$ (per unit time) NOAS trapped to the $NO_x$ trap 15 is modified by parameters of the ignition timing and the fuel injection time because changing of the ignition timing and the fuel injection time effect on the amount of $NO_x$ NOAS trapped to the $NO_x$ trap 15. Further, the amount of $NO_x$ (per unit time) NOAS trapped to the $NO_x$ trap 15 is affected by the amount of $NO_x$ which has been already trapped to the $NO_x$ trap 15. Therefore, letting an amount of $NO_x$ (per unit time) trapped by the $NO_x$ trap 15 in a condition of the $NO_x$ trap 15 having little amount of trapped $NO_x$ be NOAS, an estimated amount of $NO_x$ TNOA which has been trapped in the $NO_x$ trap 15 may be calculated by, for example, the following equation.

$$TNOA(\text{new})=TNOA(\text{old})+(1-TNOA(\text{old})/TNOAMX) \times NOAS$$

That is, an amount of $NO_x$ (per unit time) trapped by the $NO_x$ trap 15 is in proportion to a value of the saturated trapping amount subtracted by an amount of $NO_x$ which has been already trapped.

Since sulfur is contained in the fuel and the lubricant of the engine 1, $SO_x$ is contained in the exhaust gas of the engine 1 though the amount is small. The $SO_x$ is also trapped by the $NO_x$ trap 15 together with $NO_x$. However, the $SO_x$ is difficult to be purged once it is trapped, and accordingly the amount of $NO_x$ capable of being trapped by the $NO_x$ trap 15 is gradually decreased as the amount of $SO_x$ trapped by the $NO_x$ trap 15 is increased. This means that the $NO_x$ trapping capacity of the $NO_x$ trap 15 is deteriorated. In addition, the $NO_x$ trapping capacity of the $NO_x$ trap 15 may be also deteriorated heat during using the trap and various kinds of substances (lead Pb, silicon Si and so on). Therefore, it is necessary to know what amount of $NO_x$ is capable of being trapped by the $NO_x$ trap. 15, that is, to detect the saturated trapping amount of $NO_x$ TNOAMX of the $NO_x$ trap 15. This will be described below.

Initially, a method of detecting an amount of $NO_x$ actually trapped by the $NO_x$ trap 15 will be described. When the air-fuel ratio of the exhaust gas is temporally switched to stoichiometric or rich in order to purge $NO_x$ from the $NO_x$ trap 15 (the $NO_x$ purge control), an exhaust gas having a low oxygen concentration and containing a large amount of unburned HC and CO is exhausted from the engine 1.

Figure 5:
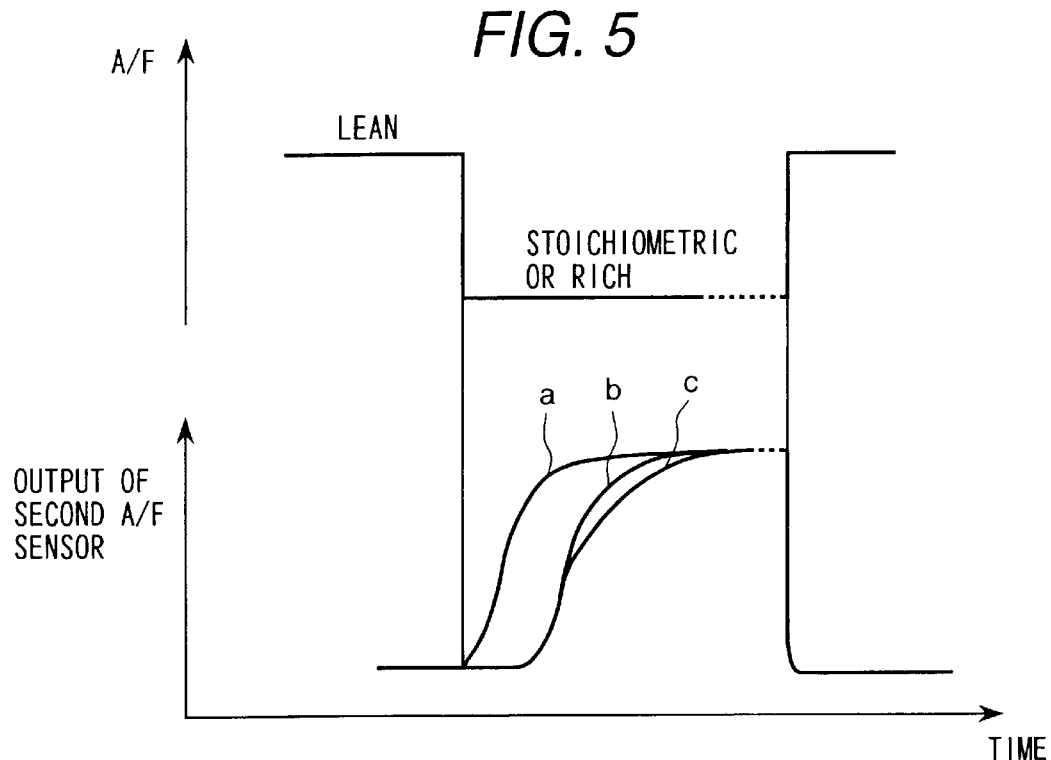
FIG. 5 is a chart explaining the relationship between an $NO_x$ trap and an output waveform of an air-fuel ratio sensor placed downstream of the $NO_x$ trap at controlling $NO_x$ purge.

At that time, in the case where the $NO_x$ trap 15 is placed or where a catalyst having an oxygen storage capacity or the like is placed upstream of the $NO_x$ trap 15, stored oxygen is released first. When the oxygen concentration in the $NO_x$ trap 15 is decreased as the release is progressed, the trapped $NO_x$ is released and at the same time reduced by the unburned HC and CO, or the trapped $NO_x$ is contact reduced in the trapped state. FIG. 5 shows examples of output waveforms of the second air-fuel ratio sensor 25 at $NO_x$ purge controlling. The curves a and b show the output waveforms of the second air-fuel ratio sensor 25 for the cases where the $NO_x$ traps 15 used are different in the amount of storing oxygen (oxygen storage capacity) from each other and the amount of trapped $NO_x$ is equal to each other, and the curve a shows the case of the small oxygen storage capacity and the curve a shows the case of the large oxygen storage capacity. Therein, it can be considered that the amount of storing oxygen is equal to the oxygen storage capacity because oxygen can be fully stored up to the oxygen storage capacity in a short time by performing the lean operation. The curves b and c show the output waveforms of the second air-fuel ratio sensor 25 for the cases where the same $NO_x$ trap 15 is used and the amount of trapped $NO_x$ is different from each other, and the curve b shows the case of the small amount of trapped $NO_x$ and the curve c shows the case of the large amount of trapped $NO_x$. In these cases, the amount of storing oxygen (oxygen storage capacities) are equal to each other.

Figure 6:
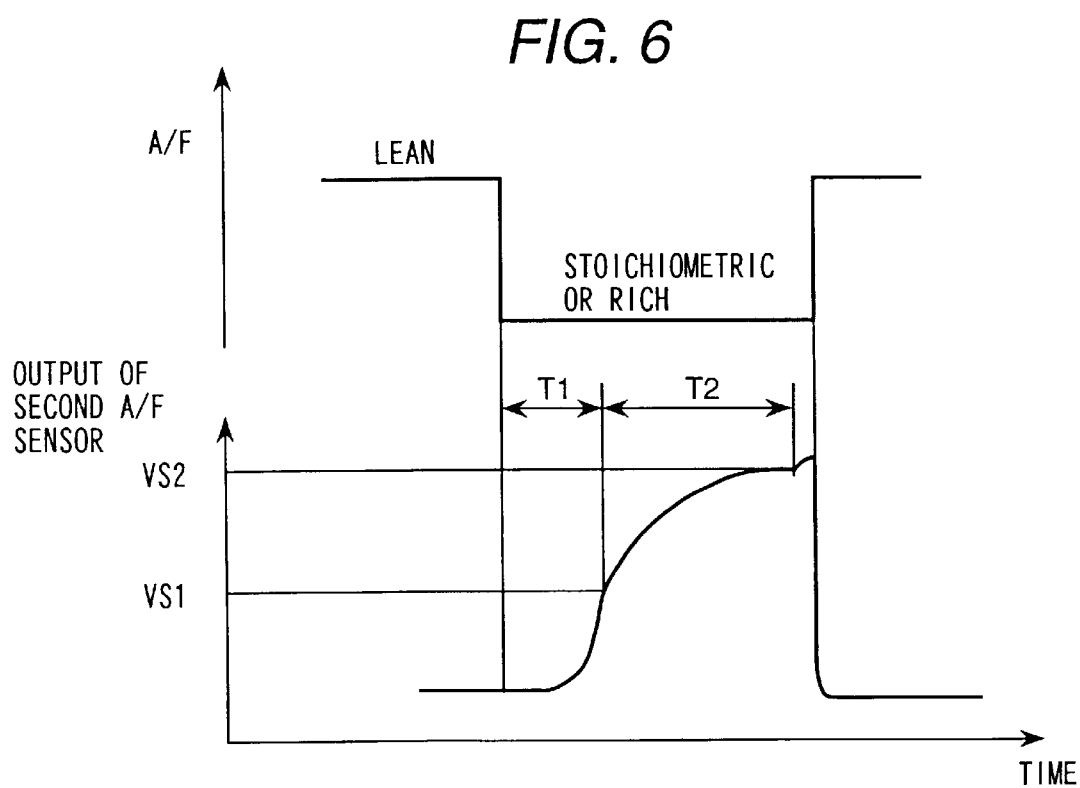
FIG. 6 is a chart explaining the method of judging an oxygen storage capacity and an amount of trapped $NO_x$ using an output waveform of an air-fuel ratio sensor placed downstream of an $NO_x$ trap at controlling $NO_x$ purge.
Figure 7:
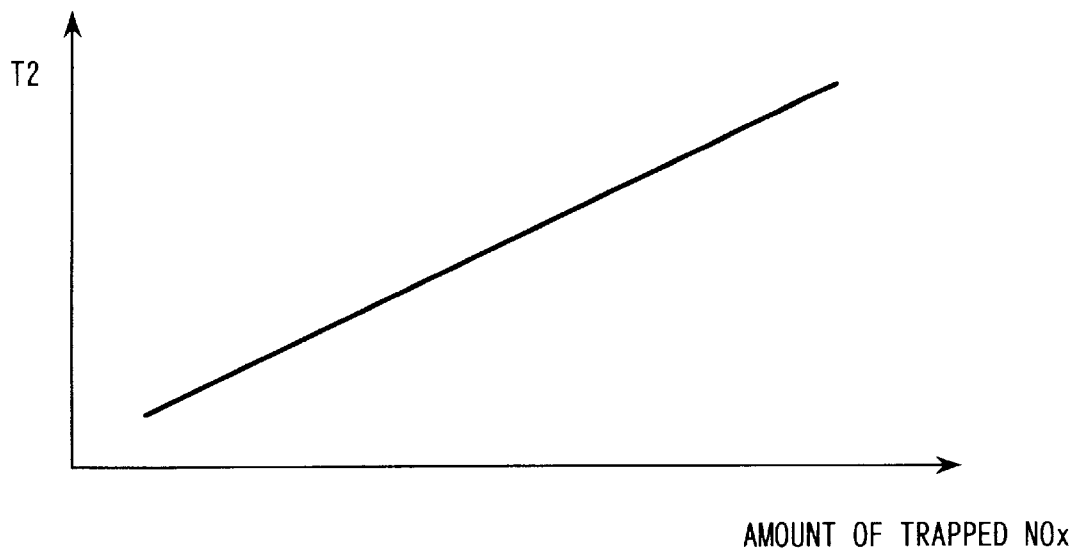
FIG. 7 is a graph showing the relationship between T2 and an amount of trapped $NO_x$.
Figure 8:
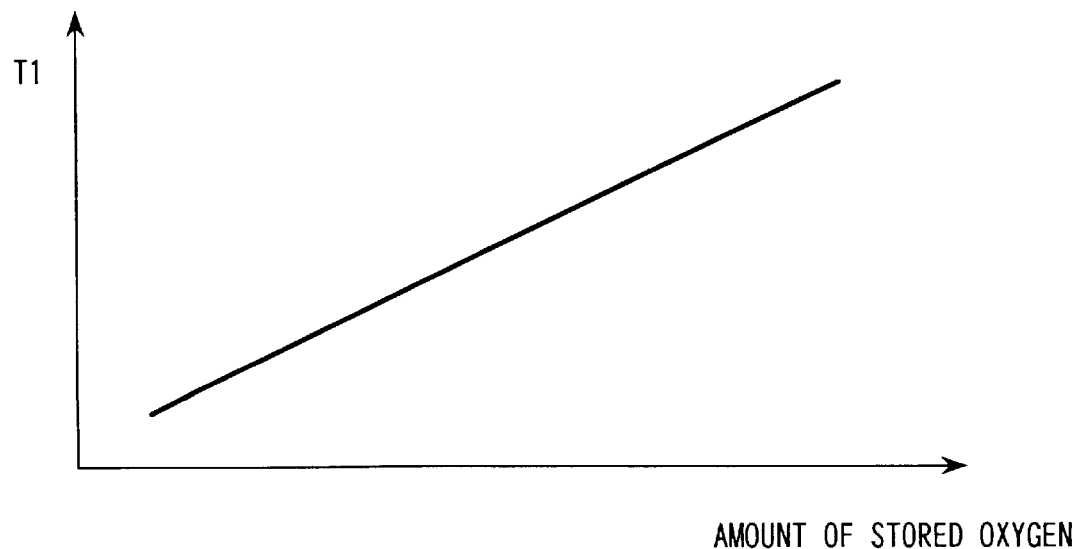
FIG. 8 is a graph showing the relationship between T1 and an oxygen storage capacity.

As shown in FIG. 6, a threshold value VS1 expressing the lean air-fuel ratio and a threshold value VS2 expressing the rich air-fuel ratio are set, and a time period from the time when the $NO_x$ purge control is started to the time when the output of the second air-fuel ratio sensor 25 crosses the threshold value VS1 is let be T1, and a time period from the time when the output of the second air-fuel ratio sensor 25 crosses the threshold value VS1 to the time when the output of the second air-fuel ratio sensor 25 crosses the threshold value VS2 is let be T2. FIG. 7 and FIG. 8 show the relationship between T2 and the amount of trapped $NO_x$ and the relationship between T1 and the amount of stored oxygen when the operating condition is the same, respectively. It can be understood from the figures that there are linear relationships between T2 and the amount of trapped $NO_x$ and between T1 and the amount of stored oxygen, respectively.

It was verified from an experiment that in the $NO_x$ trap 15 used in the experiment, the amount of stored oxygen and the amount of trapped $NO_x$ could be separately detected by setting the value VS1 to approximately 0.2 V and the value VS2 to approximately 0.8 V. Further, it was verified from the experiment that the timing of the output of the second air-fuel ratio sensor 25 crossing the value VS2 was the timing of completion of purging of $NO_x$ trapped to the $NO_x$ trap. Therefore, completion of the purge control is set to a timing after the output of the second air-fuel ratio sensor 25 crossing the value VS2.

Because the voltage values of VS1 and VS2 described above are changed when the second air-fuel sensor 25 is deteriorated, it is preferable that the voltage values of VS1 and VS2 are modified corresponding to the output at the lean operation and the output at the rich operation.

It is obvious from the above explanation that the amount of stored oxygen can be detected from the time period T1 by setting only the value VS1.

Figure 9:
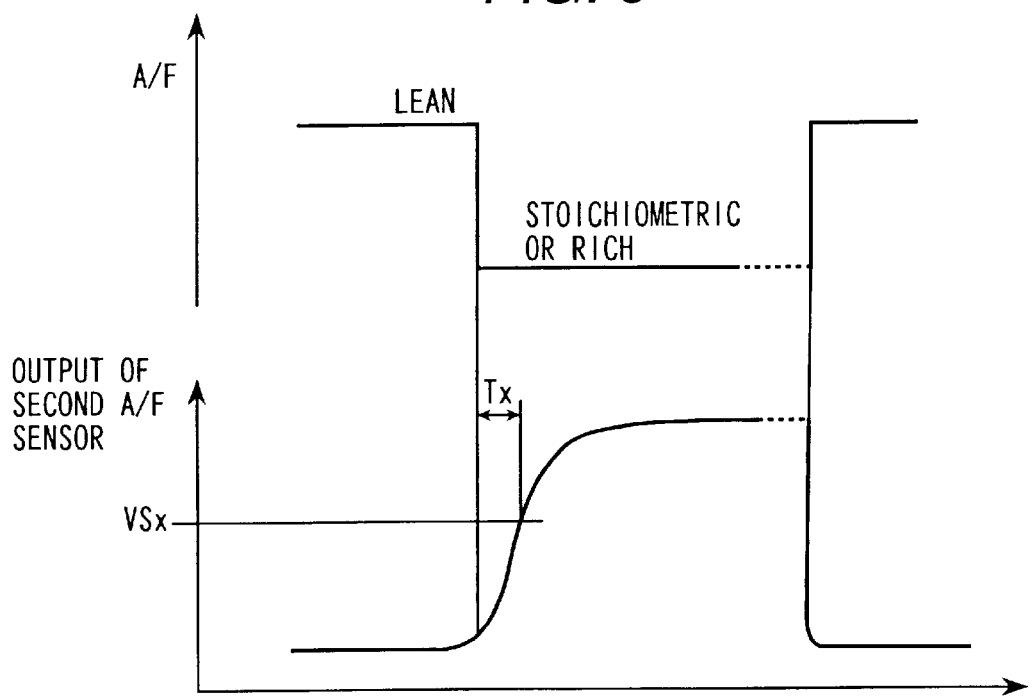
FIG. 9 is a chart explaining a method of judging an amount of trapped $NO_x$ using an output waveform of an air-fuel ratio sensor placed downstream of an $NO_x$ trap at controlling $NO_x$ purge in a conventional technology.
Figure 10:
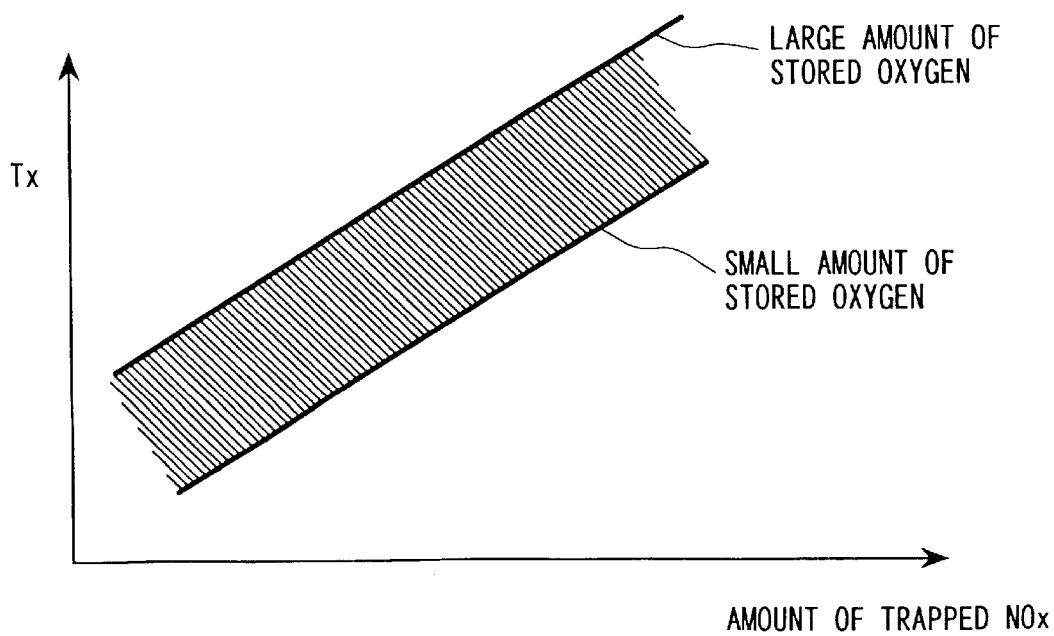
FIG. 10 is a graph showing the relationship between $T_x$ and an amount of trapped $NO_x$ in the conventional technology.

FIG. 9 shows a method of detecting an amount of trapped $NO_x$ in a conventional technology. A threshold value VSx (approximately 0.5 V) expressing the vicinity of the stoichiometric air-fuel ratio is set, and a time period Tx from the time when the $NO_x$ purge control is started to the time when an output of an air-fuel ratio sensor crosses the threshold value VSx is measured. In this case, the relationship between the amount of trapped $NO_x$ and the time period Tx is as shown in FIG. 10. The amount of trapped $NO_x$ can be detected from the time pe. The amount of trapped $NO_x$ cannot be detected from the time period Tx when the amount of stored oxygen is different.

Because the $NO_x$ trapped in the $NO_x$ trap 15 is almost purged within the above-mentioned time period T2, the amount of the $NO_x$ which has been trapped by being absorbed or adsorbed to the $NO_x$ trap 15 can be known by obtaining the amount of the $NO_x$ which is purged during the time period T2.

The unburned HC and CO contained in the exhaust gas are used for reducing $NO_x$ while the $NO_x$ is being purged from the $NO_x$ trap 15. Therefore, the amount of $NO_x$ purged from the $NO_x$ trap 15 per unit time NODS is in proportion to the amount of the unburned HC and CO supplied per unit time, that is, the amount of excess fuel supplied per unit time. The amount of excess fuel supplied per unit time Qfex can be calculated from the following equation.

$$Qfex = k1 \cdot Ti \cdot (Kr-1)/Kr \cdot Ne$$

$$= k1 \cdot Ti \cdot Qa \cdot (Kr-1)$$

where k1 is a proportional constant, and the others are the same as explained in the equation for Ti. Since the amount of $NO_x$ purged from the $NO_x$ trap 15 per unit time NODS is in proportion to Qfex, NODS can be expressed by the following equation letting a proportional constant be k2.

$$NODS = k2 \cdot Qfex$$

$$= k \cdot Qa \cdot (Kr-1)$$

where $k=k1 \cdot k2$.

When the value Kr is excessively large at the purge control (the air-fuel ratio is too rich), there is a possibility that the unburned HC and CO are supplied in exceeding the reaction rate of reducing $NO_x$ trapped in the $NO_x$ trap 15 though it depends on the kind of the $NO_x$ trap 15. In such a case, part of the unburned HC and CO pass through the $NO_x$ trap 15 without reacting with $NO_x$, and accordingly a calculation error occurs in the amount of trapped $NO_x$. On the other hand, the value Kr at the normal $NO_x$ purge control is sometimes set to a somewhat large value (for example, Kr>1.1) in order to accelerate purging of $NO_x$. Therefore, it is preferable that the value Kr at the $NO_x$ purge control for obtaining the amount of trapped $NO_x$ is set to a value different from the value Kr at the normal $NO_x$ purge control (for example, 1<Kr<1.1).

As described above, the amount of the $NO_x$ which has been trapped in the $NO_x$ trap 15 can be obtained by calculating the sum TNOD of NODS during the above-mentioned time period T2 at the $NO_x$ purge control. That is, the amount of the $NO_x$ is expressed by the following equation.

$$TNOD = \Sigma NODS \text{ (sum during } T2)$$

$$= k \cdot \Sigma \cdot \{Qa \cdot (Kr-1)\} \text{ (sum during } T2)$$

In the equation calculating the amount of $NO_x$ purged from the $NO_x$ trap 15 per unit time NODS, that is, $$NODS = k \cdot Qa \cdot (Kr-1),$$

actually, the value Kr is often a fixed value (for example, a plurality of fixed values are predetermined for individual operating modes). Therefore, the sum TNOD of NODS during the time period T2 is in proportion to the sum of Qa during the time period T2. Accordingly, the TNOD may be calculated from the following equation.

$$TNOD = k' \cdot Qave \cdot Kr \cdot T2$$

where k' is a proportional constant, and Qave is an average value of Qa during the time period T2.

Figure 11:
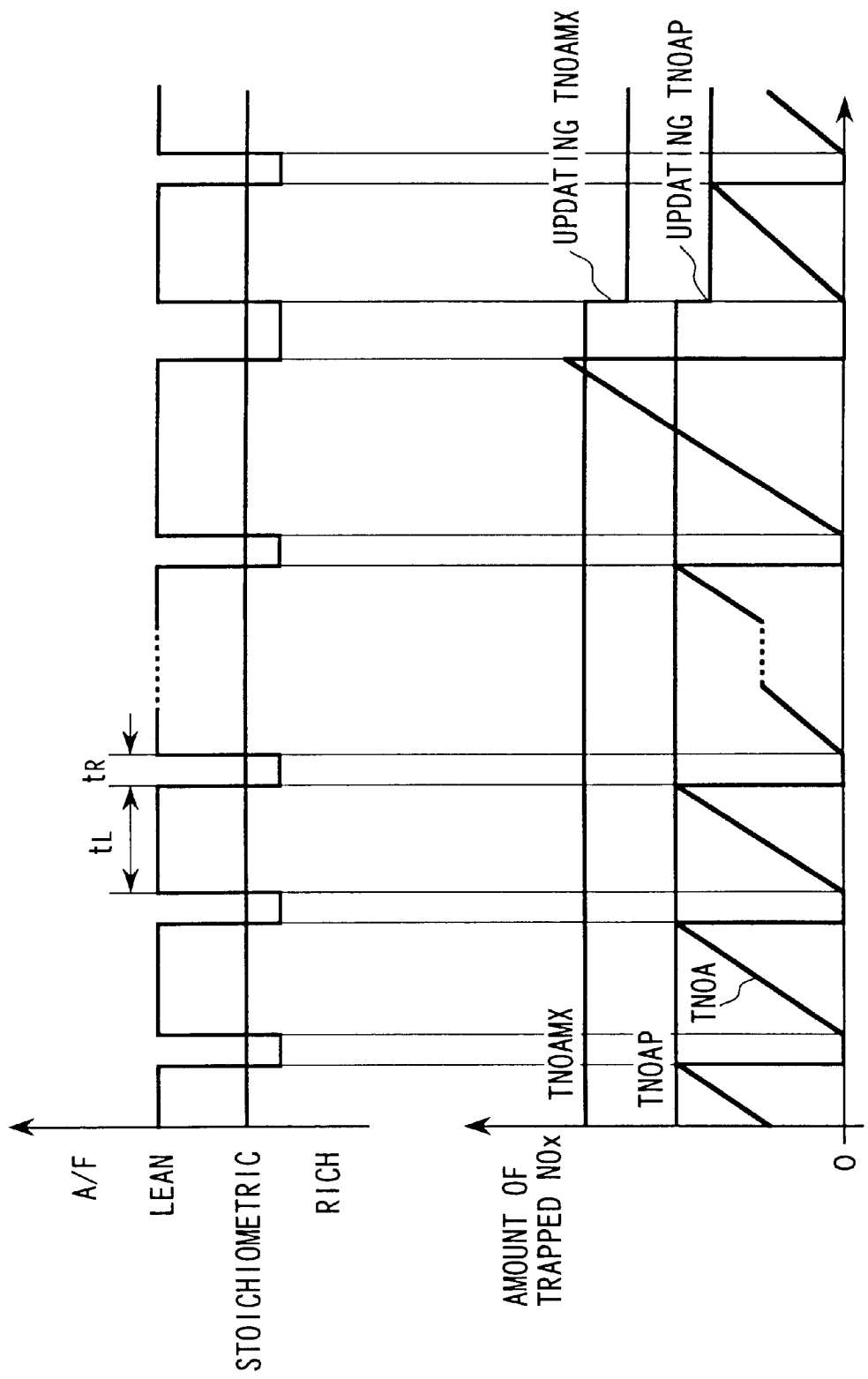
FIG. 11 is a chart explaining timings of $NO_x$ purge control and judgment of deterioration.

In order to detect the saturated trapping amount of $NO_x$ TNOAMX of the $NO_x$ trap 15, the amount of trapped $NO_x$ TNOA trapped in the $NO_x$ trap 15 at the $NO_x$ purge control must be equal to the saturated trapping amount of $NO_x$. On the other hand, the normal $NO_x$ purge control is started at the time when the estimated amount of trapped $NO_x$ TNOA trapped in the $NO_x$ trap 15 reaches to a value TNOAP which is smaller than the saturated trapping amount of $NO_x$ TNOAMX. Therefore, as shown in FIG. 11, in the normal operation, the $NO_x$ purge control is started to be performed at the time when the estimated amount of trapped $NO_x$ TNOA reaches TNOAP. Only the time the saturated trapping amount of $NO_x$ TNOAMX is detected, the $NO_x$ purge control is started to be performed at the time when TNOA reaches a value slightly larger than the saturated trapping amount of $NO_x$ TNOAMX. A detected value of the amount of trapped $NO_x$ TNOD is obtained through the method described above, and the saturated trapping amount of $NO_x$ TNOAMX is updated corresponding to the detected value TNOD, and further the threshold value TNOAP for starting the normal $NO_x$ purge control is also updated.

By the method described above, the saturated trapping amount of $NO_x$ TNOAMX of the $NO_x$ trap 15 is detected. When the detected saturated trapping amount of $NO_x$ TNOAMX is smaller than a predetermined value, for example, control for recovering from $SO_x$ poisoned state is performed. After performing the control, if the detected saturated trapping amount of $NO_x$ TNOAMX is still smaller than the predetermined value, it is judged that the $NO_x$ trap 15 is deteriorated. Then, a code expressing deterioration of the $NO_x$ trap 15 is stored and/or warning is made to the driver by switching on the warning lamp.

The control for recovering from SOX poisoned state is performed by increasing temperature of the $NO_x$ trap 15 up to a preset temperature, for example, 600° C. and continuing operation in keeping the air-fuel ratio rich for a preset time period.

On the other hand, since the estimated amount of trapped $NO_x$ TNOA is an estimated value anyway, it has an error. Factors of the error are a difference between the map value presetting the amount of $NO_x$ trapped in the $NO_x$ trap (discharged from the engine 1) and the actual value, deterioration in the $NO_x$ trapping performance of the $NO_x$ trap 15 and so on. Therefore, it is preferable that the estimated amount of trapped $NO_x$ TNOA is used, for example, by being modified as follows. That is, by comparing the detected value of the amount of trapped $NO_x$ TNOD which is detected in the normal $NO_x$ purge control with the threshold value TNOAP corresponding to the estimated amount of $NO_x$ TNOA which is used for stating the $NO_x$ purge control, the estimated amount of trapped $NO_x$ TNOA is modified so as to be equal to the detected value of the amount of trapped $NO_x$ TNOD.

In detail, for example, a coefficient kc of the following equation is calculated, and the coefficient kc is used for the estimated amount of trapped $NO_x$ TNOA as a new estimated amount of trapped $NO_x$ TNOA.

$$kc(new)=kc(old)\cdot TNOAP/TNOA$$

When the above modification coefficient kc is largely deviated from 1, the fact may be used for judgment that there is an abnormality in the engine 1 or the $NO_x$ trap 15. In detail, when kc<1 and the deviation is large, it can be judged that the $NO_x$ trap 15 is deteriorated. In order to increase the accuracy of the judgment of deterioration, it is preferable that when the $NO_x$ trap 15 is judged by the deviation of coefficient kc to be deteriorated, the aforementioned judgment of deterioration of the $NO_x$ trap is performed. On the other hand, when kc>1 and the deviation is large, the amount of $NO_x$ exhausted from the engine 1 is larger than the preset map value and accordingly it can be judged that there is an abnormality in the engine 1.

It is preferable that the detection of the saturated trapping amount of $NO_x$ TNOAMX and the judgment of deterioration of the $NO_x$ trap 15 are performed only when predetermined condition is held, for example, when the temperature or the operating condition of the $NO_x$ trap 15 is within a predetermined range, when a preset time is elapsed, or when the deterioration is judged by the coefficient kc, as described above. The reason will be described below.

Since the amount of trapped $NO_x$ of the $NO_x$ trap 15 is strongly affected by the temperature of the $NO_x$ trap 15, the condition in regard to the temperature of the $NO_x$ trap 15 is set. The amount of trapped $NO_x$ of the $NO_x$ trap 15 is decreased when the temperature of the $NO_x$ trap 15 is both too low and too high. The temperature may be directly measured or estimated from the operating condition.

The operating condition is set in order to improve the accuracy of estimating the estimated amount of trapped $NO_x$ TNOA. The lean operation is continued until the estimated amount of trapped $NO_x$ TNOA becomes larger than the saturated trapping amount of $NO_x$ TNOAMX. Therefore, if the estimated amount of trapped $NO_x$ TNOA is estimated smaller than the actual value, an amount of $NO_x$ passing through the $NO_x$ trap 15 is increased. On the other hand, if the estimated amount of trapped $NO_x$ TNOA is estimated larger than the actual value, the $NO_x$ purge control is started before the amount of trapped $NO_x$ reaches the saturated trapping amount of $NO_x$ TNOAMX and as a result the saturated trapping amount of $NO_x$ TNOAMX may be judged to be smaller than the actual value. Therefore, the stable operating range is set as the condition.

In order to detect the saturated trapping amount of $NO_x$ TNOAMX, it is necessary to perform the $NO_x$ purge control after trapping $NO_x$ more than the saturated trapping amount of $NO_x$, and as the result an amount of $NO_x$ passing through the $NO_x$ trap 15 is somewhat increased. Therefore, frequency of detecting the saturated trapping amount of $NO_x$ TNOAMX needs to be limited. In detail, detection of the saturated trapping amount of $NO_x$ TNOAMX is executed after elapsing a preset time from the precedent detection, or number of times to perform detection of the saturated trapping amount of $NO_x$ TNOAMX from starting to stopping operation of the engine is limited. of $NO_x$ TNOAMX from starting to stopping operation of the engine is limited.

In the above explanation, the saturated trapping amount of $NO_x$ TNOAMX is compared with the preset value in order to judge whether or not the control for recovering from $O_x$ poisoned state is executed, or in order to judge whether or not the $NO_x$ trap 15 is deteriorated. On the other hand, it is possible to use the aforementioned equations. The aforementioned equation of the detected value of the amount of trapped $NO_x$ TNOD used for calculating the saturated trapping amount of $NO_x$ TNOAMX, that is, $$TNOD=k\cdot\Sigma\cdot\{Qa\cdot(Kr-1)\}(\text{sum during T2}),$$

or the equation when Kr is a fixed value, that is, $$TNOD=k'\cdot Qave\cdot Kr\cdot T2.$$

It is possible that threshold values are pre-stored in a Qa map or a Kr map, and the judgment is executed by comparing T2 with the threshold value.

Another embodiment of judging deterioration of the $NO_x$ trap 15 will be described below. In the normal. $NO_x$ purge control, TNOAPC is made by increasing the threshold value TNOAP for starting $NO_x$ purge control, for example, by a preset value at a preset timing. Detected values of the amount of trapped $NO_x$ when the threshold values are TNOAP and TNOAPC are obtained, and a difference between them is calculated. When the difference becomes smaller than a preset value, TNOAP is reduced by a preset value. If the updated TNOAP becomes smaller than a preset value, it is judged that the $NO_x$ trap 15 is deterorated. This embodiment makes use of the fact that the amount of trapped $NO_x$ is varied corresponding to the amount of $NO_x$ flowing into the $NO_x$ trap 15 if the amount of trapped $NO_x$ is within the saturated trapping amount of $NO_x$ TNOAMX. On the contrary, if the amount of trapped $NO_x$ reaches the saturated trapping amount of $NO_x$ TNOAMX, the amount of trapped $NO_x$ in the $NO_x$ trap 15 is not increased even if the $NO_x$ flows into the $NO_x$ trap 15. The essence of the present invention is that by examining change of the detected value of the amount of trapped $NO_x$ TNOD when the estimated amount of trapped $NO_x$ TNOA is changed, it is judged whether the amount of trapped $NO_x$ reaches the saturated trapping amount of $NO_x$ TNOAMX. Therefore, the present invention is not limited to the other processes.

Figure 12:
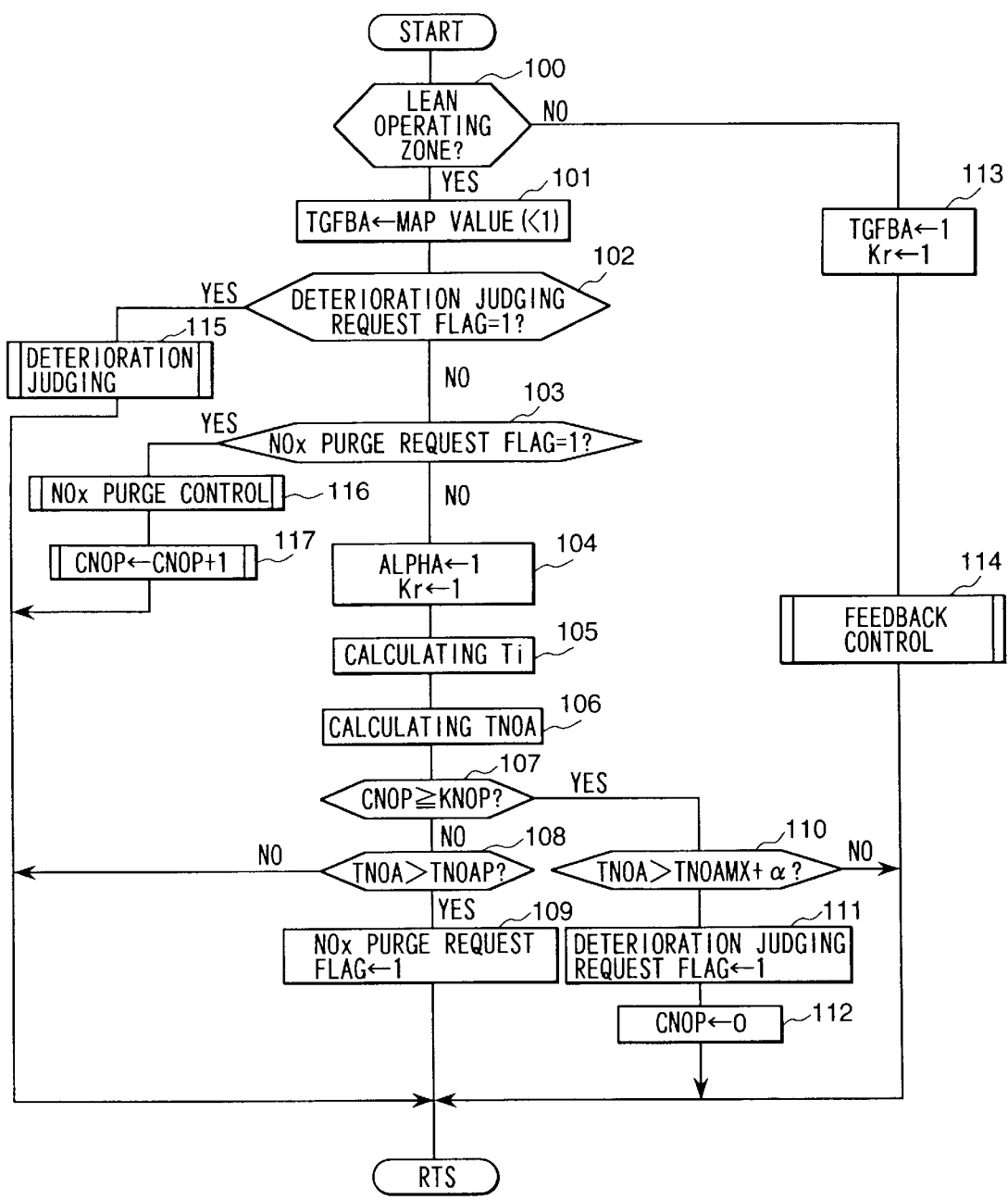
FIG. 12 is a flowchart explaining the process of fuel control.

FIG. 12 is a flowchart showing an embodiment of an air-fuel ratio control process. The control is started every preset time (for example, 20 ms) from a main routine, not shown.

In Step 100, it is judged whether or not the operating mode is in the lean operating zone. In this step, it is judged whether or not each of the load, the rotational speed, the cooling water temperature of the engine 1 and the speed of the vehicle is within an individual preset range. If it is judged that the operating mode is not in the lean operating zone, the processing proceeds to Step 113 to set TGFBA to 1 and Kr to 1. That is, the stoichiometric operation is performed. Next, the processing proceeds to Step 114 to perform feedback control of the air-fuel ratio based on an output of the first air-fuel ratio sensor 14.

If it is judged in Step 100 that the operating mode is in the lean operating zone, the processing proceeds to Step 101 to search the map of rotational speed and load of the engine 1 shown by FIG. 4 for a corresponding value (<1) and set the value to the target equivalent ratio TGBF. Next, the processing proceeds to Step 102. If a deterioration judging request flag is set (=1), a deterioration judging subroutine of Step 115 (to be described later) is executed and this control flow is completed. If the deterioration judging request flag is not set, the processing proceeds to Step 103. If an $NO_x$ purge request flag, to be described later, is set (=1), an $NO_x$ purge control subroutine of Step 116 (to be described later) is executed. Then, in Step 117, a counter CNOP for number of times of normal $NO_x$ purge control is counted up by 1 and this control flow is completed. If the $NO_x$ purge request flag is not set, the processing proceeds to Step 104 to set the feedback coefficient ALPHA to 1 and the air-fuel ratio modification coefficient at $NO_x$ purge control Kr to 1. Next, the processing proceeds to Step 105 to calculate a fuel injection time Ti using the following equation.

$$Ti = K \cdot (Qa/Ne) \cdot TGFBA \cdot ALPHA \cdot Kr$$
$$= K \cdot (Qa/Ne) \cdot TGFBA$$

That is, lean operation corresponding to the target equivalent ratio TGFBA is performed.

Next, in Step 106, the estimated amount of trapped $NO_x$ TNOA is cumulatively calculated according to the following equation while the lean operation is continued.

$$TNOA(\text{new}) = TNOA(\text{old}) + kc\ NOAS$$

Therein, NOAS is calculated from a map which is preset corresponding to operation states of the engine 1. The coefficient kc is an estimated error modification coefficient.

In Step 107, it is judged whether or not the counter CNOP for number of times of normal $NO_x$ purge control is larger than a judging value KNOP. If the counter CNOP for number of times of normal $NO_x$ purge control is larger than the judging value KNOP, it is judged that judgment of deterioration of the $NO_x$ trap 15 is necessary, and the processing proceeds to Step 110. Therein, it is judged whether or not the estimated amount of trapped $NO_x$ TNOA exceeds (the saturated trapping amount of $NO_x$ TNOAMX+α). If it exceeds, in Step 111 the deterioration judging request flag is set (=1) to clear the counter CNOP for number of times of the normal $NO_x$ purge control 112. If it does not exceed, the control flow is completed.

If in Step 107 the counter CNOP is not larger than the judging value KNOP, the processing proceeds to Step 108 to check the starting condition of the normal $NO_x$ purge control. Therein, it is judged whether or not the estimated amount of trapped $NO_x$ trapped TNOA exceeds the $NO_x$ purge threshold value TNOAP. If exceeds, in Step 109 the $NO_x$ purge request flag is set (=1). If the TNOA does not exceed the $NO_x$ purge threshold value TNOAP, the control flow is complete.

By the process described above, the deterioration judgment is performed every time when the normal $NO_x$ purge control is performed KNOP times.

Figure 13:
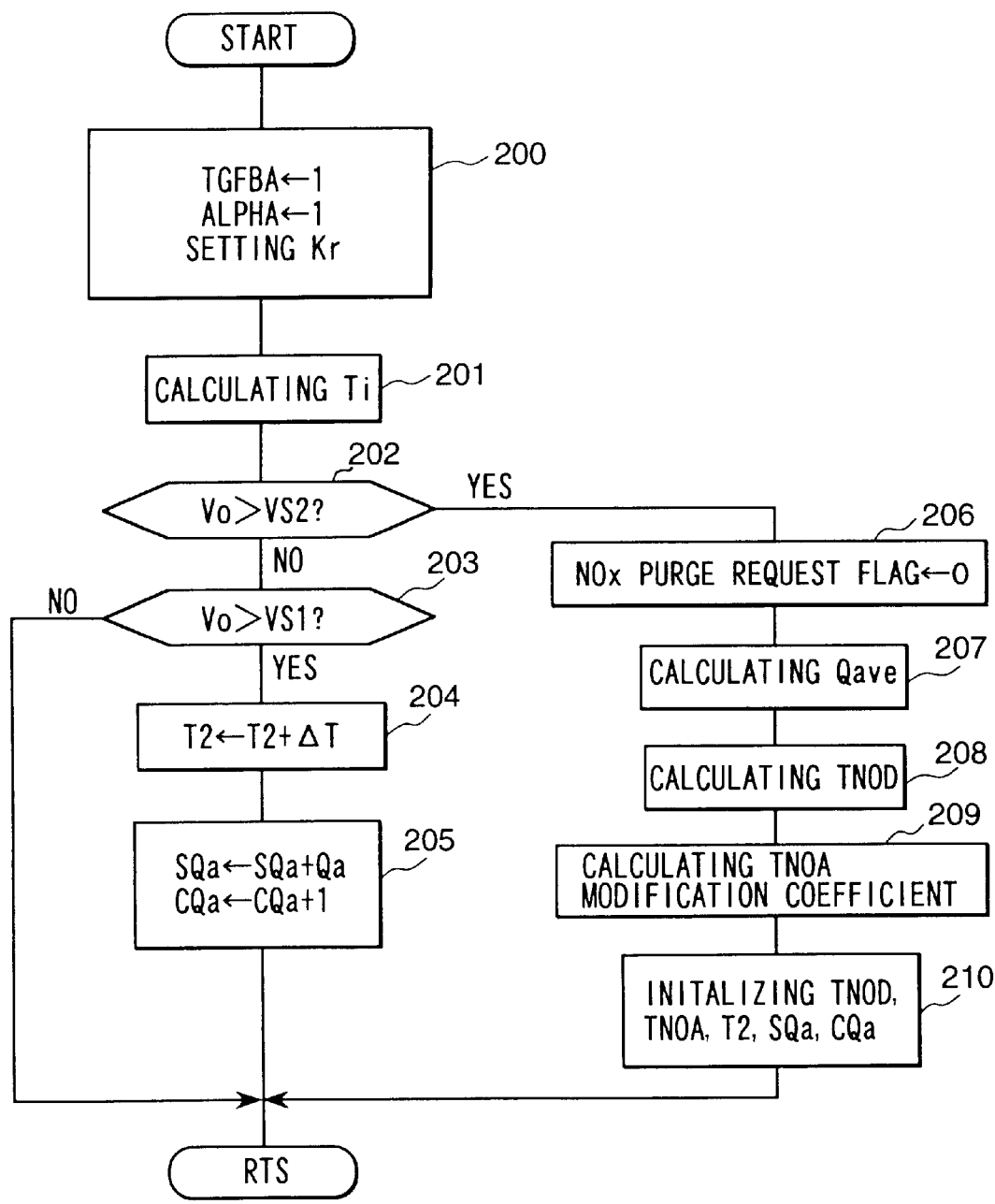
FIG. 13 is a flowchart explaining the process of $NO_x$ purge control.

FIG. 13 is a flowchart showing an embodiment of a normal $NO_x$ purge control process. The process is started as a subroutine from the control flow shown by FIG. 12 when the $NO_x$ purge control request flag is set.

Initially, in Step 200, it is set that the feedback coefficient ALPHA=1 and the target equivalent ratio TGFBA=1, and the air-fuel ratio modification coefficient Kr at the $NO_x$ purge control is also set. Further, in order to reduce a shock associated with change in the generated torque of the engine 1 caused by changing the air-fuel ratio, modification of the ignition timing is also controlled. In a case where the operating mode before starting the $NO_x$ purge control is the stratified operating mode (the very lean burning operating mode in which fuel is burned under a condition of an air-fuel ratio from 40 to 50 by forming a stratified mixture), control for switching the operating mode to the homogeneous operating mode (the operating mode to homogeneously supply the fuel) is also performed. In order to do so, control of the opening degree of the swirl control valve 6, control of the EGR amount, and control of changing the fuel injection timing and decreasing the air intake amount are performed.

Next, in Step 201, a fuel injection time Ti is calculated by the following equation.

$$Ti = K \cdot (Qa/Ne) \cdot TGFBA \cdot ALPHA \cdot Kr$$
$$= K \cdot (Qa/Ne) \cdot Kr$$

In Step 202, it is judged whether or not the output Vo of the second air-fuel ratio sensor 25 exceeds VS2. If the output Vo does not exceed the VS2, in Step 203 it is judged whether or not the output Vo exceeds VS1. If the output Vo does not exceed the VS1, the control flow is completed because the $NO_x$ purge is not started (stored oxygen is released). If the output Vo exceeds the VS1, in Step 204 the T2 is added with ΔT (control stating cycle) one by one (it is possible to add 1) because the $NO_x$ purge is being progressed. Next, the cumulative value SQa and the counter of cumulative number of times CQa of the air flow rate Qa are updated in Step 205.

If the output Vo exceeds the VS2 in Step 202, the processing proceeds to Step 206 for the completion processing because the $NO_x$ purge is completed. At that time point, the T2 becomes a value measured time period that the output Vo changes from VS1 to VS2. In Step 206, the $NO_x$ purge request flag is cleared (=0), and next in Step 207, the average air flow rate Qave during $NO_x$ purge is calculated by the following equation.

$$Qave = SQa/CQa$$

In Step 208, the estimated amount of trapped $NO_x$ TNOA is calculated by the following equation.

$$TNOD = k' \cdot Qave \cdot Kr \cdot T2$$

Next, in Step 209, the estimation error modification coefficient kc is calculated by the following equation.

$$kc(\text{new}) = kc(\text{old}) \cdot TNOAP/TNOA$$

In Step 210, TNOD, TNOA, T2, SQa and CQa are initialized, and the control flow is completed. In the case where the operating mode before initiating the $NO_x$ purge control is the stratified operating mode, the operating mode is further switched from the homogeneous operating mode to the homogeneous operating mode, and then the control flow is completed.

Figure 14:
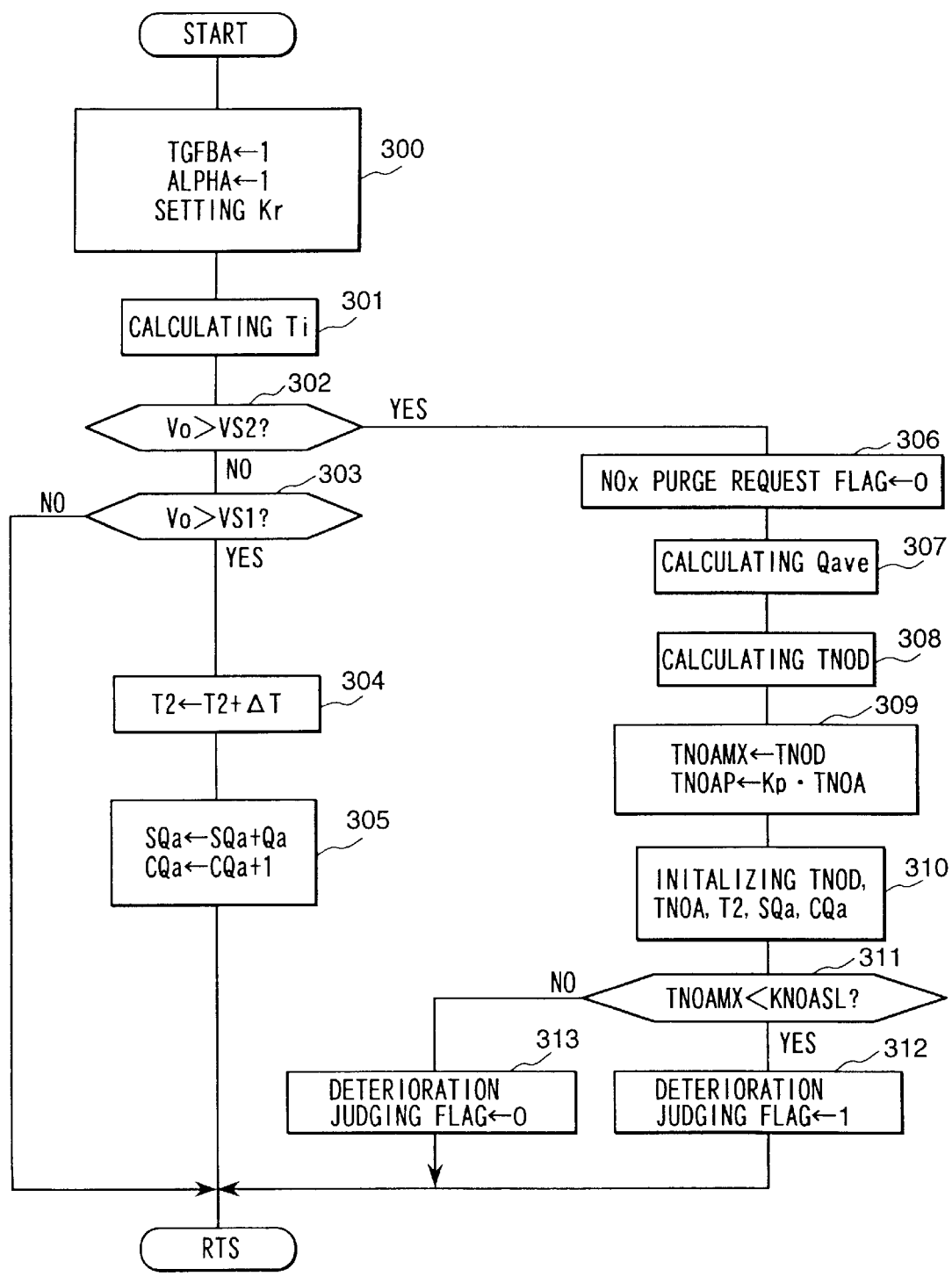
FIG. 14 is a flowchart explaining the process of deterioration judgment.

FIG. 14 is a flowchart showing an embodiment of the process of deterioration judgment. The process is started as a subroutine from the control flow shown by FIG. 12 when the deterioration judging request flag is set.

Initially, in Step 300, it is set that the feedback coefficient ALPHA =1 and the target equivalent ratio TGFBA=1, and the air-fuel ratio modification coefficient Kr at the $NO_x$ purge control is also set. Further, in order to reduce a shock associated with change in the generated torque of the engine 1 caused by changing the air-fuel ratio, modification of the ignition timing is also controlled. In a case where the operating mode before starting the $NO_x$ purge control is the stratified operating mode (the very lean burning operating mode in which fuel is burned under a condition of an air-fuel ratio from 40 to 50 by forming a stratified mixture), control for switching the operating mode to the homogeneous operating mode (the operating mode to homogeneously supply the fuel) is also performed. In order to do so, control of the opening degree of the swirl control valve 6, control of the EGR amount, and control of changing the fuel injection timing and decreasing the air intake amount are performed.

Next, in Step 301, a fuel injection time Ti is calculated by the following equation.

$$Ti = K \cdot (Qa/Ne) \cdot TGFBA \cdot ALPHA \cdot Kr$$
$$= K \cdot (Qa/Ne) \cdot Kr$$

In Step 302, it is judged whether or not the output Vo of the second air-fuel ratio sensor 25 exceeds VS2. If the output Vo does not exceed the VS2, in Step 303 it is judged whether or not the output Vo exceeds VS1. If the output Vo does not exceed the VS1, the control flow is completed because the $NO_x$ purge is not started (stored oxygen is released). If the output Vo exceeds the VS1, in Step 304 the T2 is added with ΔT (control stating cycle) one by one (it is possible to add 1) because the $NO_x$ purge is being progressed. Next, the cumulative value SQa and the counter of cumulative number of times CQa of the air flow rate Qa are updated in Step 305.

If the output Vo exceeds the VS2 in Step 302, the processing proceeds to Step 306 for the completion processing because the $NO_x$ purge is completed. At that time point, the T2 becomes a value measured time period that the output Vo changes from VS1 to VS2. In Step 306, the $NO_x$ purge request flag is cleared (=0), and next in Step 307, the average air flow rate Qave during $NO_x$ purge is calculated by the following equation.

$$Qave = SQa/CQa$$

In Step 308, the estimated amount of trapped $NO_x$ TNOA is calculated by the following equation.

$$TNOD = k' \cdot Qave \cdot Kr \cdot T2$$

Next, in Step 309, the saturated trapping amount of $NO_x$ TNOAMX is updated corresponding to TNOD, and the threshold value TNOAP for starting the normal $NO_x$ purge control is also updated. That is as follows.

$$TNOAMX = TNOD$$
$$TNOAP = Kp \cdot TNOD,$$

where Kp is a constant having a value of 0.6 to 0.8.

In Step 310, TNOD, TNOA, T2, SQa and CQa are initialized.

Next, in Step 311, it is judged whether or not the TNOAMX is smaller than a deterioration judging threshold value KNOASL. If the TNOAMX is smaller the KNOASL, in Step 312 a deterioration judging flag is set (=1). If the TNOAMX is not smaller the KNOASL, in Step 313 the deterioration judging flag is cleared (=0), and then the control flow is completed. In the case where the operating mode before initiating the $NO_x$ purge control is the stratified operating mode, the operating mode is further switched from the homogeneous operating mode to the homogeneous operating mode, and then the control flow is completed.

When the deterioration judging flag is set, by the control, not shown in the flowchart, the code expressing deterioration of the $NO_x$ trap 15 is stored and/or warning is made to the driver by switching on the warning lamp.

What is claimed is:

1. An exhaust gas cleaning system for an engine comprising an $NO_x$ trap for trapping by absorbing or adsorbing $NO_x$ in an exhaust gas when an air-fuel ratio of the exhaust gas is a lean air-fuel ratio and for releasing or reducing $NO_x$ when the air-fuel ratio is a rich air-fuel ratio, said $NO_x$ trap being arranged in an exhaust gas passage; and an air-fuel ratio changing means for temporally changing the air-fuel ratio of the exhaust gas from the lean air-fuel ratio to the stoichiometric air-fuel ratio or the rich air-fuel ratio with a predetermined cycle, which comprises:

an oxygen concentration detecting means for detecting an oxygen concentration in the exhaust gas in the downstream side of said $NO_x$ trap in the exhaust gas passage; and an $NO_x$ trap amount judging means for judging an amount of trapped $NO_x$ of said $NO_x$ trap from a detected result of said oxygen concentration detecting means in taking an oxygen storage capacity when said air-fuel ratio changing means temporally changes the air-fuel ratio of the exhaust gas to the stoichiometric air-fuel ratio or the rich air-fuel ratio.

2. An exhaust gas cleaning system for an engine according to claim 1, wherein said $NO_x$ trap amount judging means judges an amount of trapped $NO_x$ of said $NO_x$ trap based on a waveform between a first threshold expressing the lean air-fuel ratio condition and a second threshold expressing the rich air-fuel ratio condition, said waveform being a detected result of said oxygen concentration detecting means when said air-fuel ratio changing means temporally changes the air-fuel ratio of the exhaust gas to the stoichiometric air-fuel ratio or the rich air-fuel ratio.

3. An exhaust gas cleaning system for an engine according to claim 2, wherein said $NO_x$ trap-amount judging means judges an amount of trapped $NO_x$ of said $NO_x$ trap based on a required time period from a time point when a signal crosses said first threshold to a time point when the signal crosses said second threshold, said signal being a detected result of said oxygen concentration detecting means when said air-fuel ratio changing means temporally changes the air-fuel ratio of the exhaust gas to the stoichiometric air-fuel ratio or the rich air-fuel ratio.

4. An exhaust gas cleaning system for an engine according to claim 1, wherein a degree of deterioration of said $NO_x$ trap is detected based on a judged result of said $NO_x$ trap amount judging means.

5. An exhaust gas cleaning system for an engine according to claim 4, wherein a degree of deterioration of said $NO_x$ trap is detected based on a judged value of an amount of trapped $NO_x$ from said $NO_x$ trap amount judging means at a predetermined operating condition of the engine.

6. An exhaust gas cleaning system for an engine according to claim 5, wherein lean operation of the engine is limited corresponding to said detected degree of deterioration of said $NO_x$ trap.

7. An exhaust gas cleaning system for an engine according to claim 5, which comprises at least one of a memory means for storing a code expressing deterioration of said $NO_x$ trap and a warning generating means for generating warning when said degree of deterioration of said $NO_x$ trap exceeds a predetermined value.

8. An exhaust gas cleaning system for an engine according to claim 4, wherein a degree of deterioration of said $NO_x$ trap is detected based on a judged value of an amount of trapped $NO_x$ from said $NO_x$ trap amount judging means and an operating condition of the engine at the time when the judgment is made.

9. An exhaust gas cleaning system for an engine according to claim 8, wherein lean operation of the engine is limited corresponding to said detected degree of deterioration of said $NO_x$ trap.

10. An exhaust gas cleaning system for an engine according to claim 8, which comprises at least one of a memory means for storing a code expressing deterioration of said $NO_x$ trap and a warning generating means for generating warning when said degree of deterioration of said $NO_x$ trap exceeds a predetermined value.

11. An exhaust gas cleaning system for an engine according to claim 4, wherein lean operation of the engine is limited corresponding to said detected degree of deterioration of said $NO_x$ trap.

12. An exhaust gas cleaning system for an engine according to claim 11, which comprises at least one of a memory means for storing a code expressing deterioration of said $NO_x$ trap and a warning generating means for generating warning when said degree of deterioration of said $NO_x$ trap exceeds a predetermined value.

13. An exhaust gas cleaning system for an engine according to claim 4, which comprises at least one of a memory means for storing a code expressing deterioration of said $NO_x$ trap and a warning generating means for generating warning when said degree of deterioration of said $NO_x$ trap exceeds a predetermined value.

14. An exhaust gas cleaning system for an engine comprising an $NO_x$ trap for trapping by absorbing or adsorbing $NO_x$ in an exhaust gas when an air-fuel ratio of the exhaust gas is a lean air-fuel ratio and for releasing or reducing $NO_x$ when the air-fuel ratio is a rich air-fuel ratio, said $NO_x$ trap being arranged in an exhaust gas passage; and an air-fuel ratio changing means for temporally changing the air-fuel ratio of the exhaust gas from the lean air-fuel ratio to the stoichiometric air-fuel ratio or the rich air-fuel ratio with a predetermined cycle, which comprises:

an oxygen concentration detecting means for detecting an oxygen concentration in the exhaust gas in the downstream side of said $NO_x$ trap in the exhaust gas passage; and an oxygen storage capacity judging means for judging an oxygen storage capacity based on a time period from a time point when said air-fuel ratio changing means temporally changes the air-fuel ratio of the exhaust gas to the stoichiometric air-fuel ratio or the rich air-fuel ratio to a time point when a detected result of said oxygen concentration detecting means crosses a first threshold expressing the lean air-fuel ratio condition.

* * * * *